(12) United States Patent
Becker et al.

(10) Patent No.: US 10,584,875 B2
(45) Date of Patent: Mar. 10, 2020

(54) REMOTE FLAME-PRODUCING APPLIANCE CONTROL

(71) Applicant: Channel Products, Inc., Solon, OH (US)

(72) Inventors: James S. Becker, Chardon, OH (US); Daniel J. Szubra, Parma, OH (US); Russell K. Myers, Hudson, OH (US)

(73) Assignee: Channel Products, Inc., Chesterland, OH (US)

( * ) Notice: Subject to any disclaimer, the term of this patent is extended or adjusted under 35 U.S.C. 154(b) by 127 days.

(21) Appl. No.: 15/692,269

(22) Filed: Aug. 31, 2017

(65) Prior Publication Data

US 2018/0058690 A1 Mar. 1, 2018

Related U.S. Application Data

(60) Provisional application No. 62/381,889, filed on Aug. 31, 2016.

(51) Int. Cl.
*F23N 1/00* (2006.01)
*F24C 3/12* (2006.01)
(Continued)

(52) U.S. Cl.
CPC ............ *F23N 1/002* (2013.01); *F23N 5/022* (2013.01); *F23N 5/102* (2013.01); *F23N 5/203* (2013.01); *F24C 3/122* (2013.01); *G05B 19/042* (2013.01); *F23N 2023/08* (2013.01); *F23N 2023/38* (2013.01); *F23N 2027/02* (2013.01); *F23N 2027/30* (2013.01); *F23N 2037/02* (2013.01);
(Continued)

(58) Field of Classification Search
CPC ....................................... F23N 1/002

USPC ............................................. 431/6
See application file for complete search history.

(56) References Cited

U.S. PATENT DOCUMENTS

2004/0192373 A1* 9/2004 Galetti ................. G06F 9/4401
455/550.1
2005/0266363 A1* 12/2005 Ganeshan .............. F23N 5/082
431/79
(Continued)

FOREIGN PATENT DOCUMENTS

DE 20 2005 018671 U1 3/2006

OTHER PUBLICATIONS

The International Search Report and the Written Opinion of the International Searching Authority corresponding PCT application, PCT/US2017/049620, dated Dec. 6, 2017, 5 pages.
(Continued)

*Primary Examiner* — Avinash A Savani
(74) *Attorney, Agent, or Firm* — Tucker Ellis LLP; Heather M. Barnes; Michael G. Craig

(57) ABSTRACT

One or more techniques and/or systems are disclosed for controlling and managing one or more flame-producing devices, such as fire features, heating devices and/or cooking devices. Control of respective devices may be provided by a first communication component and a first controller component disposed locally on respective devices, in combination with one or more wireless remote control devices. Respective flame-producing devices may be communicatively coupled with a remote control device, allowing for commands to be sent wirelessly to the flame-producing device, and status information to be sent to the remote control device.

17 Claims, 22 Drawing Sheets

(51) Int. Cl.
  *F23N 5/20* (2006.01)
  *F23N 5/02* (2006.01)
  *F23N 5/10* (2006.01)
  *G05B 19/042* (2006.01)
  *F24B 1/02* (2006.01)
  *F24B 1/187* (2006.01)

(52) U.S. Cl.
  CPC .............. *F24B 1/028* (2013.01); *F24B 1/187* (2013.01); *G05B 2219/23051* (2013.01)

(56) References Cited

U.S. PATENT DOCUMENTS

| | | | | |
|---|---|---|---|---|
| 2006/0286495 | A1* | 12/2006 | Roussel | F23N 5/242 431/24 |
| 2007/0235020 | A1* | 10/2007 | Hills | F23N 1/002 126/512 |
| 2009/0035710 | A1* | 2/2009 | Peruch | F23N 5/123 431/255 |
| 2011/0264269 | A1* | 10/2011 | Chodacki | F24C 3/126 700/274 |
| 2012/0167869 | A1 | 7/2012 | Huang et al. | |
| 2015/0108380 | A1 | 4/2015 | Huang et al. | |
| 2015/0150404 | A1* | 6/2015 | Albizuri Landazabal | A47J 37/0713 99/329 R |

OTHER PUBLICATIONS

International Preliminary Report on Patentability to corresponding PCT application, PCT/US2017/049620, dated Mar. 5, 2019, 9 pages.

* cited by examiner

REMOTE FLAME-PRODUCING APPLIANCE CONTROL

CROSS-REFERENCE TO RELATED APPLICATIONS

This application claims priority to U.S. Provisional Patent Application Ser. No. 62/381,889, entitled REMOTE FLAME-PRODUCING APPLIANCE CONTROL, filed Aug. 31, 2016, which is incorporated herein.

BACKGROUND

Flame-producing appliances can include fire features (e.g., fire pits, fire tables, torches, etc.); fireplaces; and cooking appliances. These flame-producing appliances typically include a gas valve that opens and closes to control fuel flow to a burner, where the fuel is ignited to produce a flame. Further, some flame-producing appliances include safety features, such as a pilot valve system. Additionally, a flame-producing appliance may comprise an igniter component for use as an ignition source for the fuel at the burner.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, one or more techniques and systems for controlling and managing one or more flame-producing devices, such as fire features, heating devices and/or cooking devices. Control of respective devices may be provided by components disposed locally on respective devices, in combination with one or more wireless remote control devices. Respective flame-producing devices may be communicatively coupled with a remote control device, allowing for commands to be sent wirelessly to the flame-producing device, and status information to be sent to the remote control device.

In one implementation, a system for managing one or more flame-producing devices can comprise a first communication component engaged with a first flame-producing device. The first communication component can be configured to wirelessly receive data indicative of instructions for managing the first flame-producing device and can be configured to wirelessly transmit data indicative of status information for the first flame-producing device. Further, the communication component can comprise a first short-range, wireless networking component configured to exchange data wirelessly with one or more coupled devices. The system for managing one or more flame-producing devices can comprise a first controller component that is operably engaged with a first flame-producing device, and is operably coupled with the first communication component. The first controller component can be configured to control one or more operations of the first flame-producing device, and provide the data indicative of status information for the first flame-producing device. The first controller component can comprise a first relay that is configured to control operation of one or more connected components of the flame-producing device. Additionally, the first controller component can comprise a microcontroller that is configured to control operation of the first relays.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
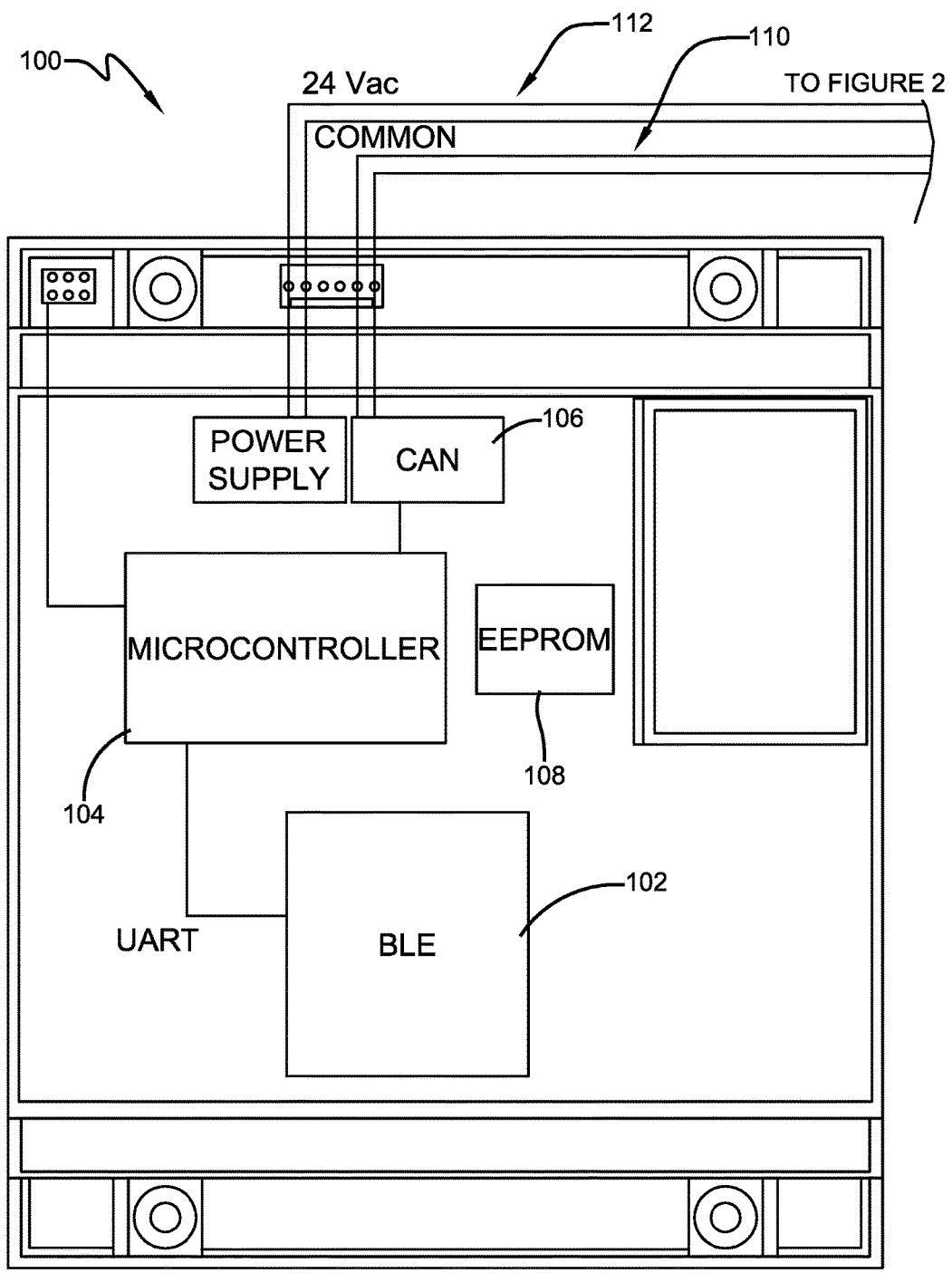
FIG. 1 is a schematic diagram illustrating an example implementation of at least a portion of an exemplary system for managing one or more flame-producing devices.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

One or more techniques and/or systems can be devised and used to manage use of one or more flame-producing devices, such as those that utilize a gas fuel/air mixture or liquid fuel/air mixture to provide fuel for flames (e.g., fire features, fireplaces, fire pits, stoves, ovens, heaters, etc.). As an example, one or more controls systems may be disposed on a flame-producing device for controlling one or more fuel valves, igniters, fans, other systems, and/or power to the device itself. Additionally, a wireless communication component can be disposed on the flame-producing device. As an example, two or more flame-producing devices may wirelessly communicate with each other, and/or, a wireless remote control device may communicate with respective flame-producing devices. In this way, as an example, the wireless remote control device may be used to operate the control systems disposed on a flame-producing device, resulting in remote, wireless control of various aspects of the flame-producing device, alone, or in conjunction with other, proximate flame-producing devices.

In one aspect, one or more control components, including a wireless networking communications component, can be installed in/on/with a flame-producing device, and coupled with internal systems to control one or more aspects of the flame-producing device. FIGS. 1-5 are schematic diagrams illustrating an exemplary implementation of one or more portions of one or more systems that may be used in/on/with a flame-producing device. In FIG. 1, an example first communications component 100 can be engaged with a first flame-producing device, such as a fire feature, fireplace, or fire pit. For example, the flame-producing device may comprise an area where one or more control component may be disposed (e.g., accessible through an access panel). In this implementation, the communications component 100 can be configured to wirelessly receive data indicative of instructions for managing the first flame-producing device; and also may be configured to wirelessly transmit data indicative of status information for the first flame-producing device.

Further, in this implementation, the first communications component 100 can comprise a first short-range, wireless networking component 102, which can be configured to exchange data wirelessly with one or more coupled devices. As one example of short-range, wireless networking, the Bluetooth low-energy (BLE) standard comprises a short-range, wireless networking arrangement that allows connection capable devices to connect with each other to send and receive data, and/or to set up a local area network for communicating with each other. In one implementation, the first short-range, wireless networking component 102 can comprise a Bluetooth module (e.g., or similar module), capable of communicatively coupling (e.g., pairing) with other Bluetooth module within range of a BLE signal (e.g., proximate to the module, such as up to thirty feet away, sometimes as much as one-hundred feet, depending on conditions). That is, for example, the first short-range, wireless networking component 102 is configured to communicatively couple with a second short-range, wireless networking component (e.g., and a third, fourth, etc.). It should be understood that the first short-range, wireless networking component 102 (e.g., or second or third, etc.) is not limited to a Bluetooth module using a BLE signal to set up a personal area network (PAN). For example, the first short-range, wireless networking component 102 can comprise an Ultra Wideband (UWB) system, an Induction wireless system, RF-Lite (a.k.a. ZigBee) system, or other close-range data communications systems available.

In one implementation, the first communications component 100 can comprise a microprocessor 104, such as a microcontroller or transceiver. As an example, the microprocessor may comprise an 8-bit microcontroller unit (MCU), comprising a processor core, memory, and programmable input/output peripherals, configured to work with a controller area network (CAN) (e.g., and may comprise a CAN controller). In this implementation, the microprocessor 104 may be coupled with a CAN unit 106, which may comprise a CAN transceiver, and/or a CAN controller. The CAN unit 106 can be coupled with a CAN bus 110, which may comprise two (e.g., or more) communication cables. Additionally, in one implementation, the first communications component 100 can comprise non-volatile storage memory 108, such as EEPROM (Electrically Erasable Programmable Read-Only Memory) or similar, for example, for storing programming (e.g., firmware), process values, or other operational data.

Figure 2:
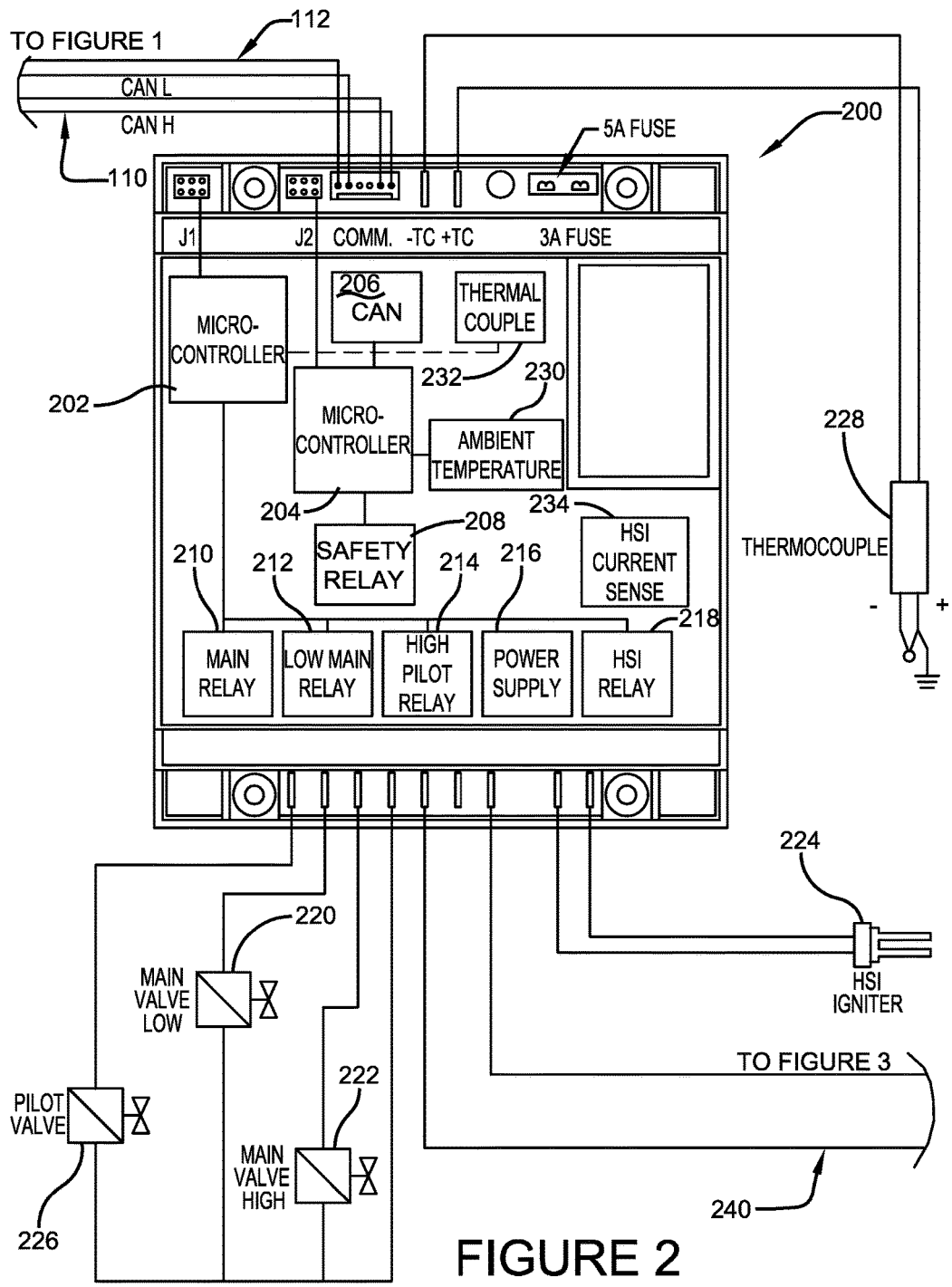
FIG. 2 is a schematic diagram illustrating an example implementation of at least a portion of an exemplary system for managing one or more flame-producing devices.

In FIG. 2, an example first controller component 200 can be engaged with the first communications component 100, for example, communicatively coupled by the CAN bus 110. It should be noted that alternate implementations of the coupling between the controller component 200 and the communications component 100 are anticipated, and the systems and techniques disclosed herein are not limited to the example implementations described. For example, the controller component 200 and the communications component 100 may be disposed on a same board (e.g., printed circuit board (PCB)), and can be electrically connected using conductive tracks disposed on the PCB. Further, for example, the controller component 200 and the communications component 100 may be disposed remotely from each other, and communicate wirelessly.

In this implementation, the first controller component 200 can comprise one or more microcontrollers 202, 204 (e.g., MCUs), for example, a main controller 202 and a watchdog controller 204 (e.g., or slave controller). The one or more microcontrollers can, respectively comprise a processor core, memory (e.g., flash and/or RAM), and programmable input/output peripherals, and may also be configured to work with a CAN. The first controller component 200 can also comprise a CAN transceiver 206 (e.g., and/or CAN controller) coupled with the CAN bus 110 for sending and/or receiving data to/from the communication component 100.

In one implementation, one or more relays 208, 210, 212, 214, 216, 218 may be disposed on the first controller component 200. For example, the controller component 200 can comprise a safety relay 208, which may be used to deactivate (e.g., shut off) one or more portions of the system when an internal or external fault is detected; such as shutting off power to one or more fuel valves, ignitors, etc. As another example, the controller component 200 can comprise a main relay 210, providing a main power switch; a low main relay 212, providing a power switch to a low main fuel valve 220; a high main relay 214, providing a power switch to a high main fuel valve 222; a power supply relay 216, to provide a power switch to the power supply 240; an igniter relay 218, to provide a power switch to an igniter 224; and a pilot valve relay (not shown), providing a power switch to a pilot fuel valve 226.

Further, in one implementation, the first controller component 200 can comprise one or more sensor components 230, 232, 234, for detecting conditions in a flame-producing device. For example, an ambient temperature sensor component 230 may be coupled with (e.g., or comprise) a temperature sensor to detect the temperature at a desired location (e.g., at the location of the controller, internal to the flame device, flame temperature, etc.). Additionally, a thermocouple component 232 may be used to detect data associated with the thermocouple 228, such as a temperature, an electrical current, a condition, or some other status of the thermocouple 228. As one example, the thermocouple 228 can be utilized for flame monitoring, such a burner flame. In this example, after a successful burner ignition has occurred, the thermocouple 228 can continue to monitor the burner flame presence. Further in this example, if the flame is extinguished the thermocouple 228 provide signals to the first controller component 200, which may respond accordingly. For example, in the event that a flame does not occur during an ignition sequence, or cannot be obtained after appropriate control sequencing, the first controller component 200 can shut down gas respective burners by de-energizing respective gas valve relay outputs. The first controller component 200 can also comprise an igniter sensor 234, which may be configured to detect a status of the igniter 224, such as an electrical current at the igniter 224.

Figure 3:
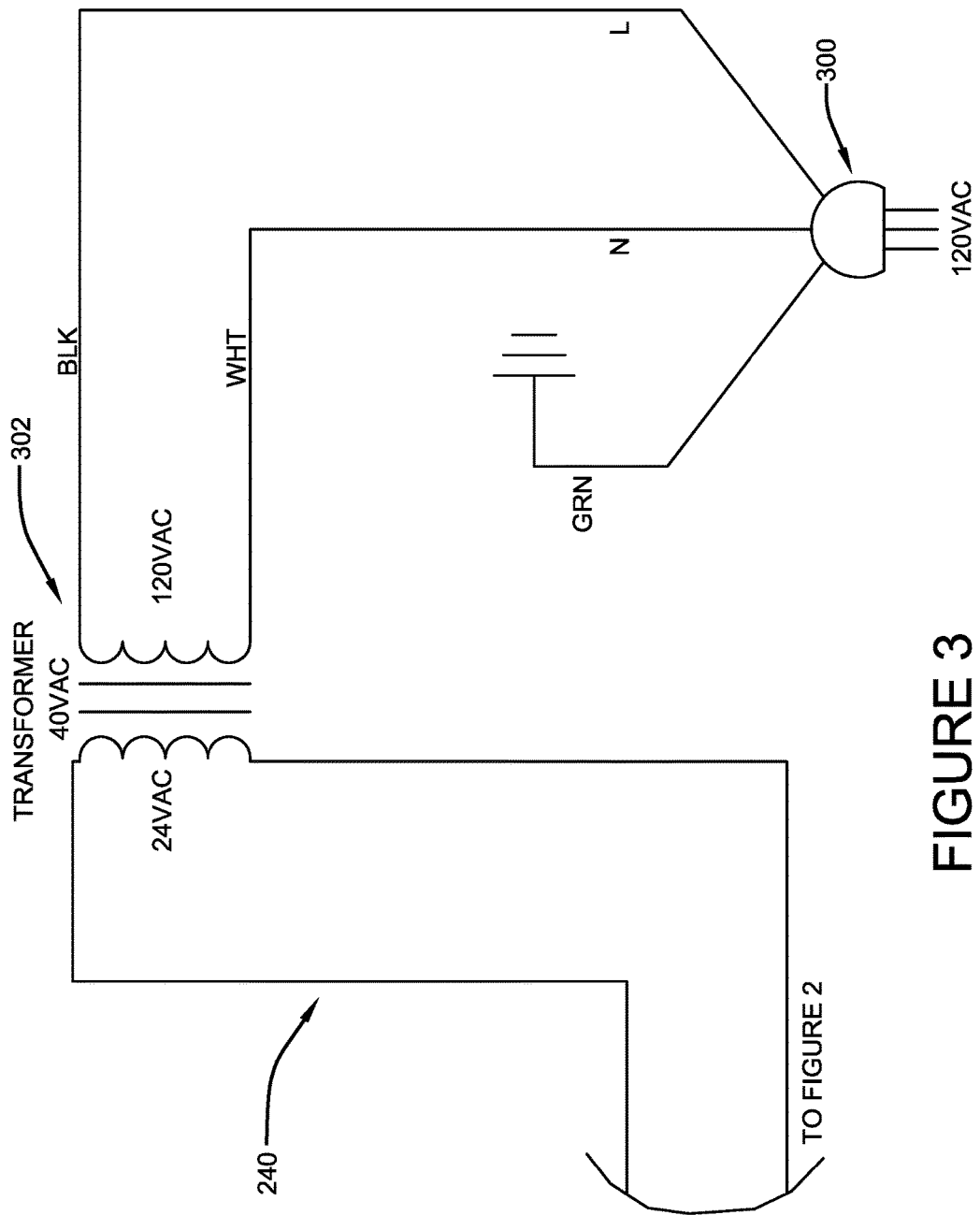
FIG. 3 is a schematic diagram illustrating an example implementation of at least a portion of an exemplary system for managing one or more flame-producing devices.

In FIG. 3, an example power source 300, such as a 120 VAC typically found in U.S. outlets, can provide power to the example system. In one implementation, a transformer 302 can be implemented to step down the voltage to 24 VAC for use with the system. Further, in one implementation, a powers supply line 240 can be coupled to the system, such as through the first controller component 200.

Figure 4:
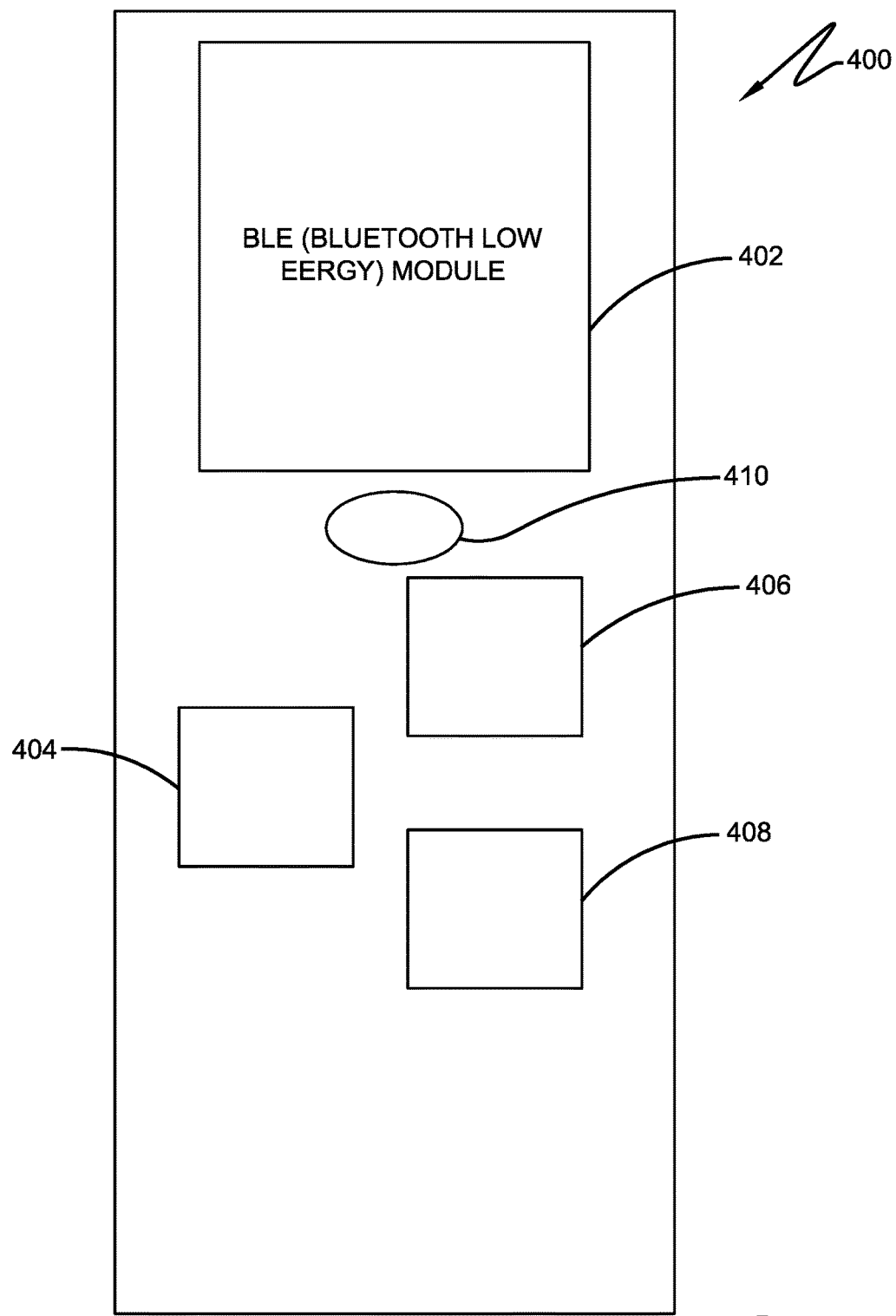
FIG. 4 is a schematic diagram illustrating an example implementation of at least a portion of an exemplary system for managing one or more flame-producing devices.

FIG. 4 is a component diagram of one implementation of a portion of the example system. In this implementation, a remote control device 400 may be configured to wireless couple with the system to provide instructions for operating and managing one or more of the flame-producing devices. In this example, the remote control device 400 can comprise a remote wireless communication component 402, such as a Bluetooth module. The remote wireless communication component 402 can be configured to wirelessly couple with the communications component 100, for example, such as through the short-range, wireless networking component 102. In this example, the remote wireless communication component 402 can wirelessly pair with the short-range, wireless networking component 102 to set up a short-range communications network, for example, for exchanging data, such as instructions.

Further, the remote control device 400 can comprise a power activation button 404 (e.g., switch), a low flame activation button 406, and/or a high flame activation button 408. In this implementation, selecting (e.g., a user pushing) the power activation button 404 can result in the remote control device 400 transmitting data, to the communications component 100, indicative of instructions to activate (e.g., power-up) the flame-producing device. In one implementation, the remote control device 400 can comprise a command indicator that provides visual feedback to a user that a command or instruction has been transmitted. As an example, a LED light may be disposed on the front of the remote, and may light up when a button is selected, and/or when instructions are transmitted.

Figure 5:
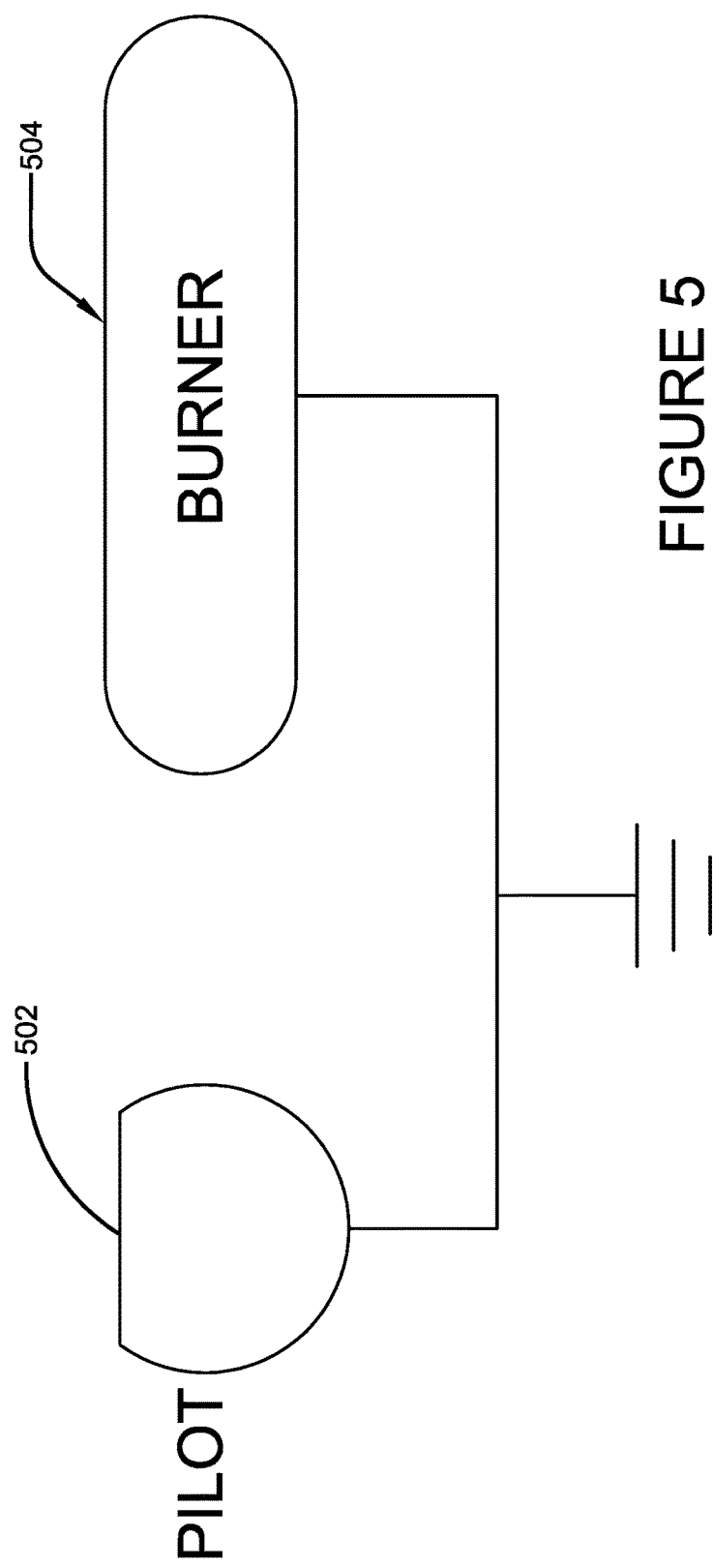
FIG. 5 is a schematic diagram illustrating an example implementation of at least a portion of an exemplary system for managing one or more flame-producing devices.

In one implementation, activation of the system may comprise opening the pilot valve 226 (e.g., using the pilot relay) and activating the igniter 224, resulting in a pilot flame 502 of FIG. 5. Additionally, in this implementation, selecting the low flame activation button 406 may result in the remote control device 400 transmitting data, to the communications component 100, indicative of instructions to activate the main low valve 220, such as by activating the low main relay 212. In this implementation, selecting the high flame activation button 408 may result in the remote control device 400 transmitting data, to the communications component 100, indicative of instructions to activate the main high valve 222, such as by activating the main relay 210. In this implementation, for example, the respective valves in the flame-producing device may comprise electromechanical valve actuators, which, when powered (e.g., are provided with electrical power) result in the valve opening, thereby allowing for fuel flow through the valve, which can result in a flame (e.g., high and/or low) at a burner 504 of FIG. 5. In this implementation, when deactivated, the valves may return to a default, closed position; thereby shutting off fuel flow through the valve.

Figure 6:
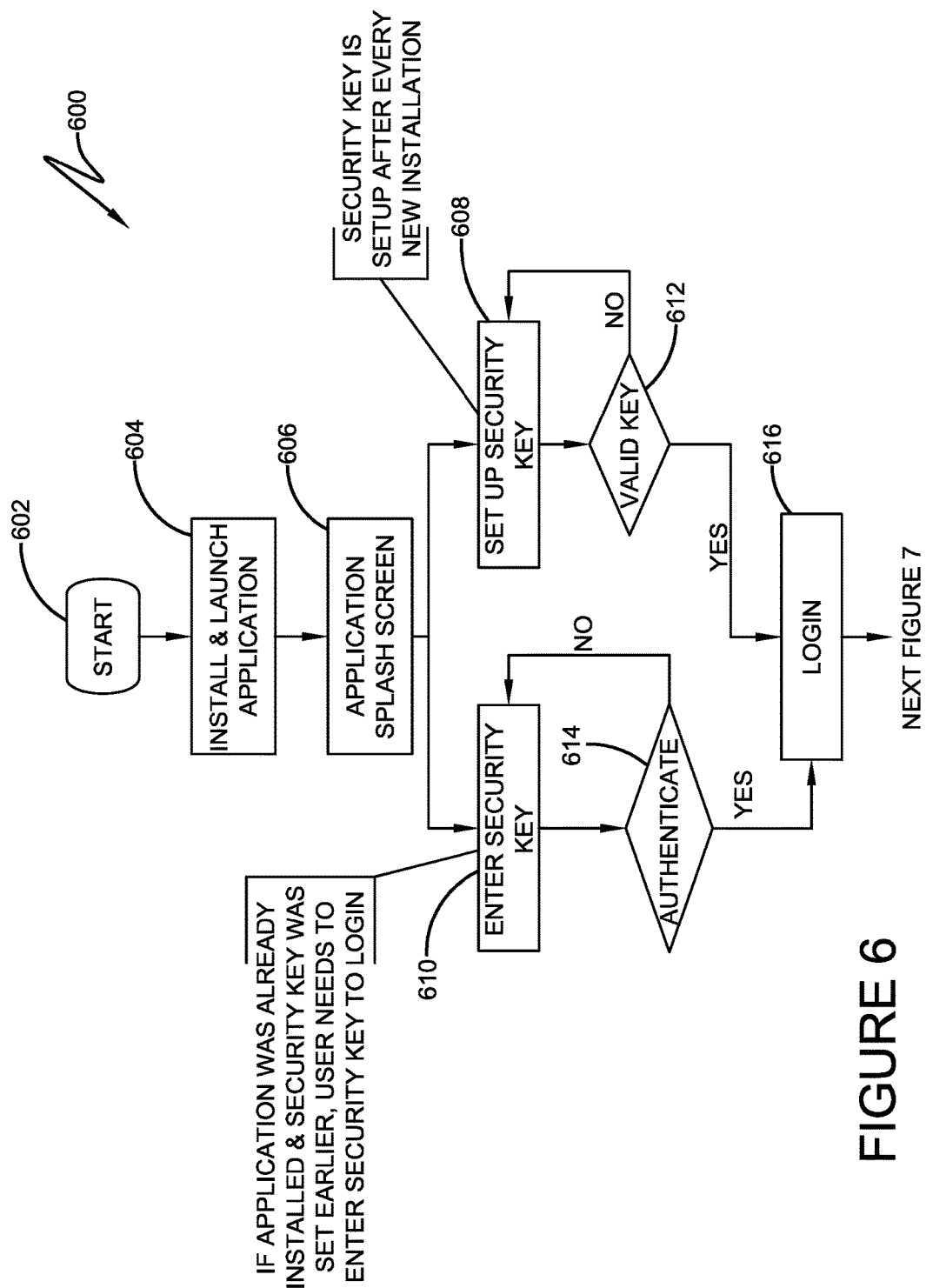
FIG. 6 is a flow diagram illustrating an example implementation of at least a portion of an exemplary method for managing one or more flame-producing devices.
Figure 7:
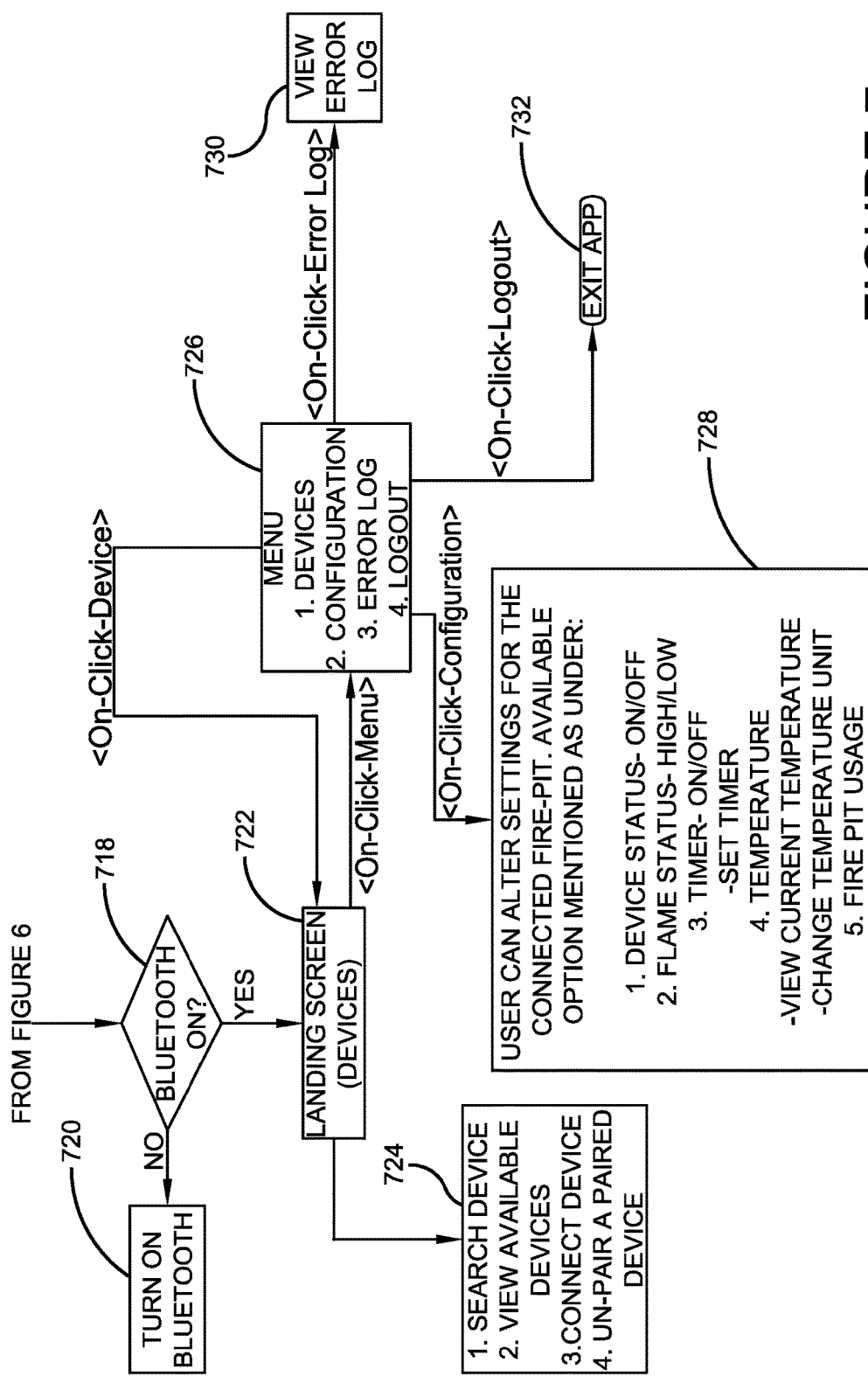
FIG. 7 is a flow diagram illustrating an example implementation of at least a portion of an exemplary method for managing one or more flame-producing devices.
Figure 8:
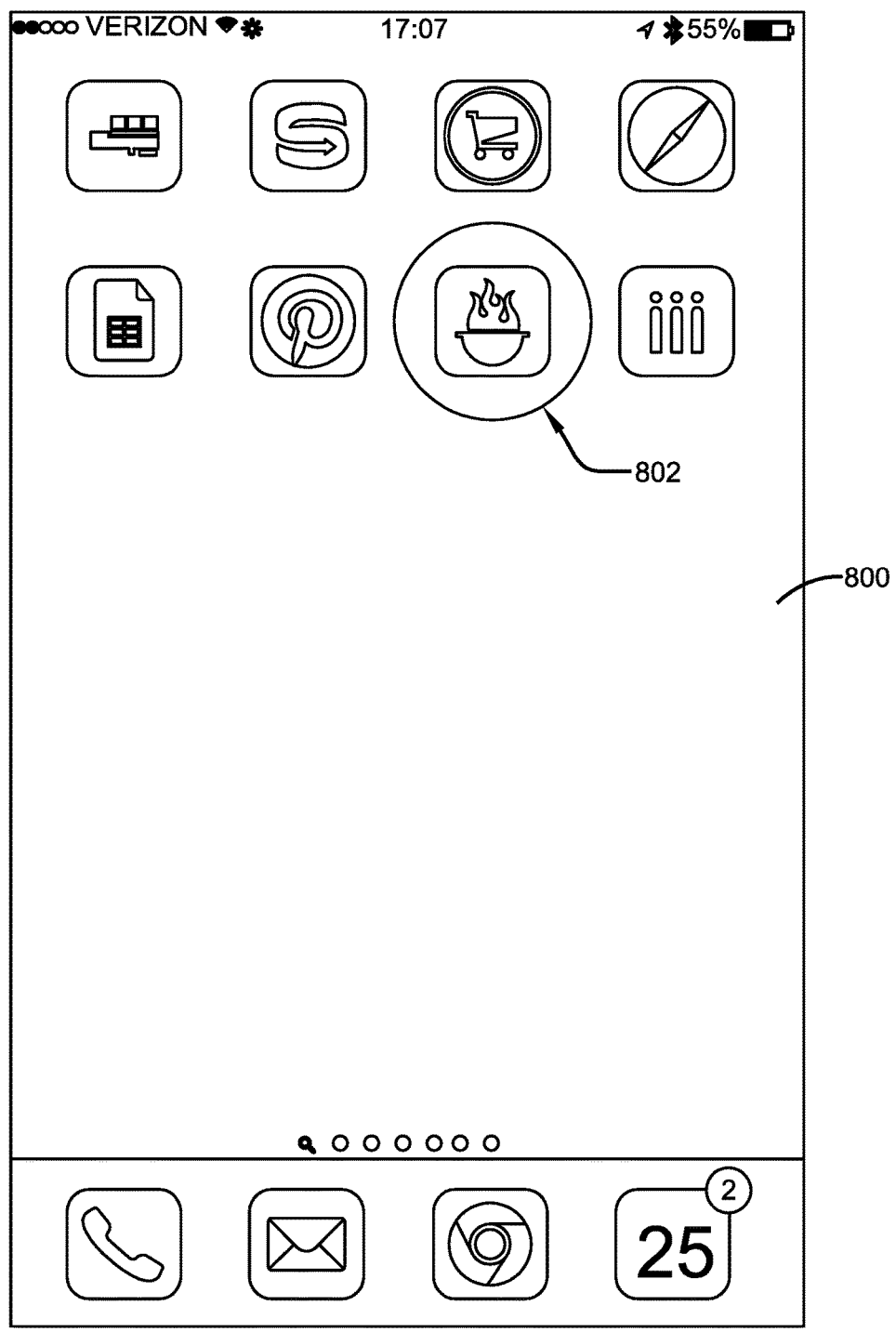
FIGS. 8-20 are component diagrams illustrating an example implementation of one or more portions of one or more systems for managing one or more flame-producing devices.

A method and non-transient computer readable media disposed on the wireless remote control device can be devised for managing one or more flame-producing devices. FIGS. 6 and 7 are flow diagrams illustrating at least a portion of an example method 600 for managing a flame-producing device. FIGS. 8-20 are component diagrams illustrating use of an example non-transient computer readable media disposed on the wireless remote control device. In one implementation, the wireless remote control device can comprise a portable computing device (e.g., smartphone, tablet, etc.) with an interactive (e.g., touch enabled) display (e.g., touch screen).

Figure 9:
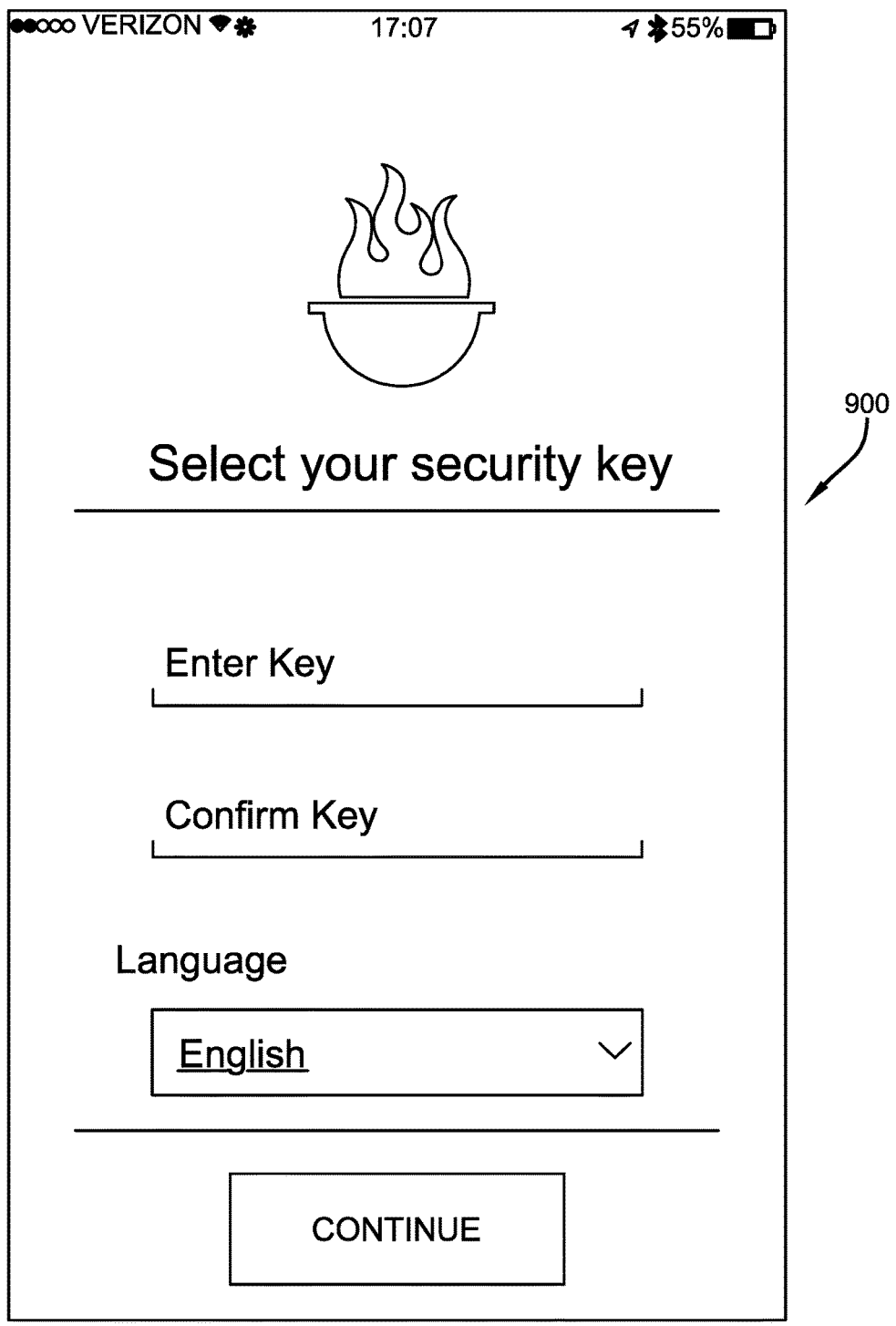

In FIG. 6, the example method 600 begins at 602. At 604, an application (e.g., programming, software, etc.) can be downloaded (e.g., installed) on the wireless remote control device; and the application can be launched (e.g., activated). For example, in FIG. 8, the application icon 802 can be selected by a user, such as by touching the icon 802 on the touch screen 800. At 606, the application may open, and a screen may be displayed that allows for entering security information 900, as shown in FIG. 9. If security information has not been previously entered by an authorized user, the security information may be entered, at 608. Alternately, if the application had previously been installed and the security information previously set up for the user, the security information may be entered at 610, as shown at 900. If the newly provided security information is validated, at 612, or authenticated, at 614, the application may login the user into for continued use, at 616.

Figure 10:
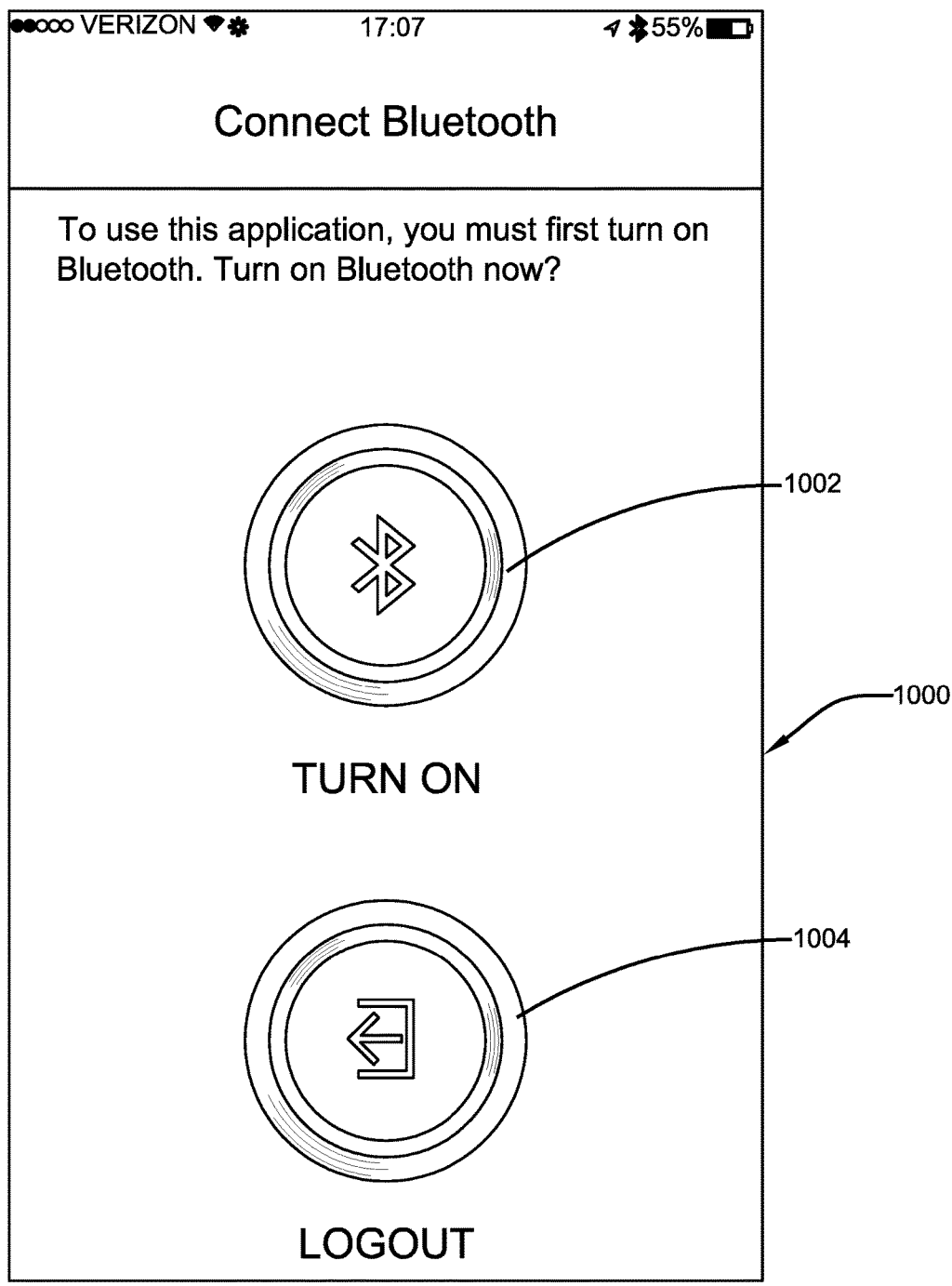

In FIG. 7, continued from FIG. 6, the application may identify whether the wireless networking component (e.g., Bluetooth module) on the wireless device is active, at 718. If the wireless networking component is not activated, the application may provide a display that allows the user to activate it, as illustrated in FIG. 10. At 720, the user may select to activate the wireless networking component, such as by selecting the activation widget 1002 on the display screen 1000. Alternately, the user may opt to log-out of the application by selecting the logout widget 1004 on the display screen 1000. In this implementation, the application may provide a landing screen, at 722, comprising a list of available flame-producing devices 1104 to which the wireless remote control device may have been previously coupled (e.g., paired), as illustrated in FIG. 11.

At 724, the application may provide a user with a variety of options. As illustrated in FIG. 11, the user may select a search for devices widget 1102. In one implementation, selecting this option may result in the wireless remote control device searching or scanning for available devices within an available proximity, with which to wirelessly couple. That is, for example, if the communications component (e.g., 100) of a proximate device is active, the wireless remote control device may identify it as available for coupling. Further, at 724, and illustrated in FIG. 11, and FIG. 19, the user may be able to view the available devices 1104, 1904 for connecting with, and may allow the user to connect with an available device, such as by selecting the paired device name 1902, on the display screen 1900. Additionally, the application may provide for the user to disconnect from (e.g., unpair) an available device 1902, such as by selecting the device name 1902, and subsequently selecting a disconnect option.

Figure 11:
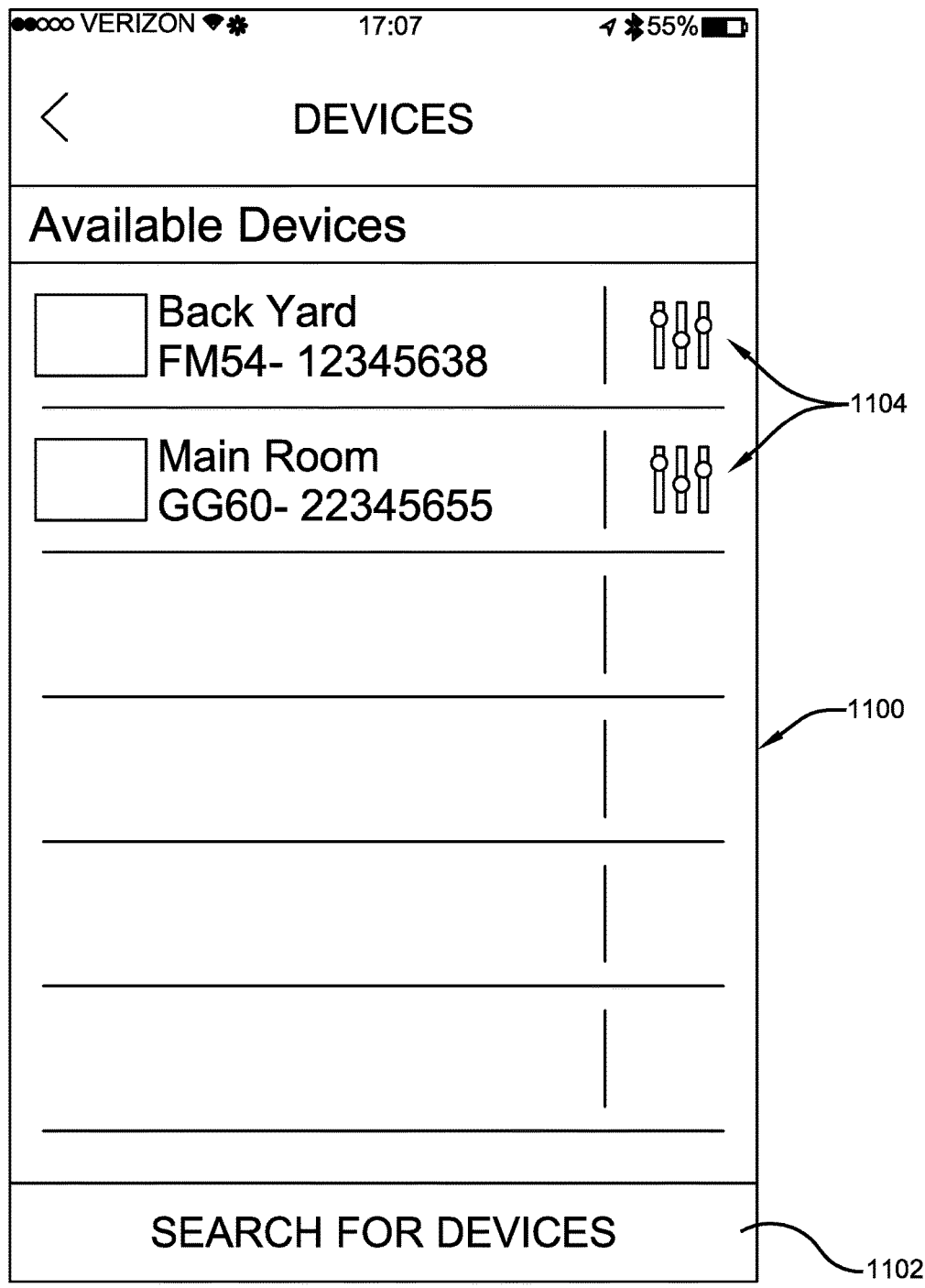
Figure 12:
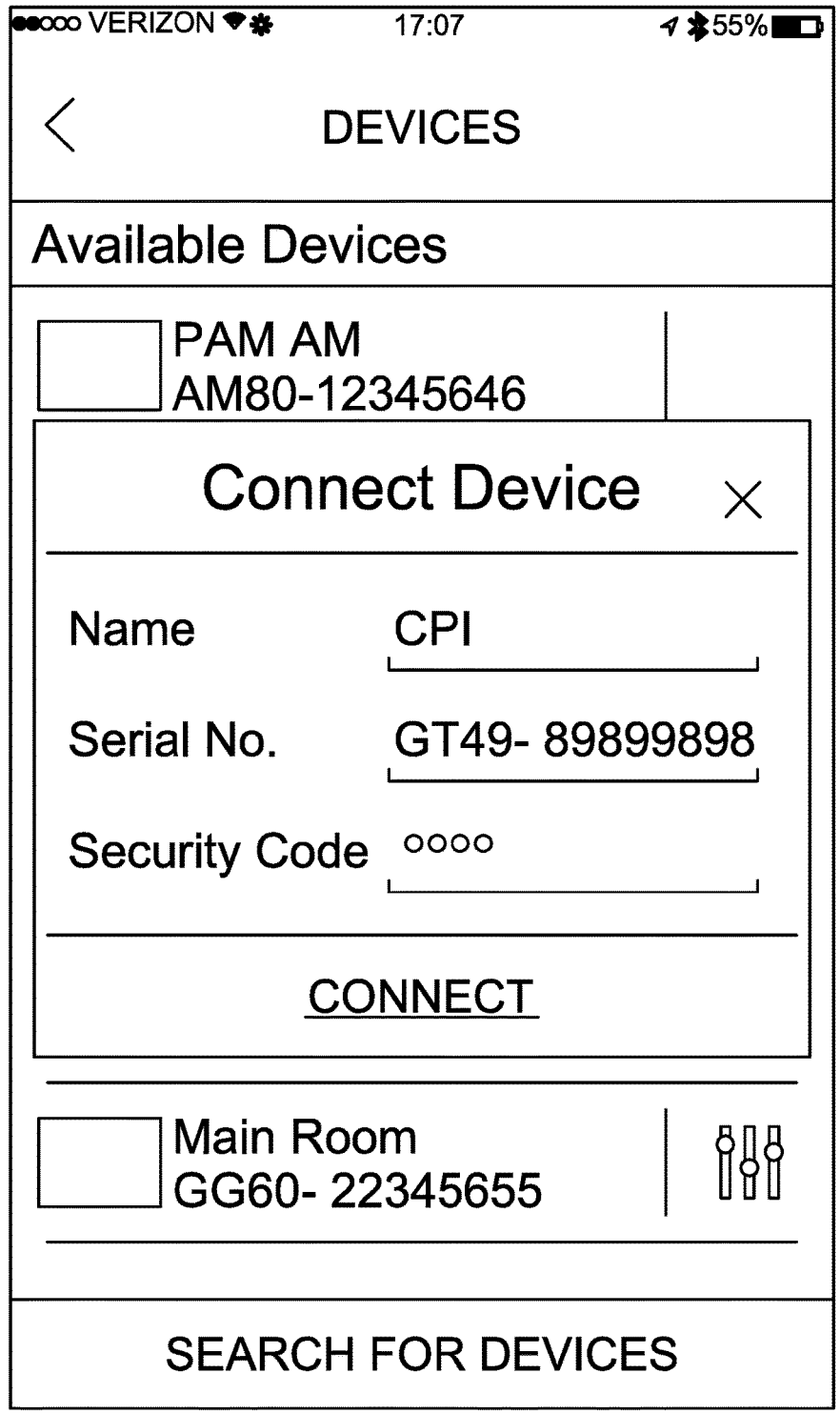
Figure 19:
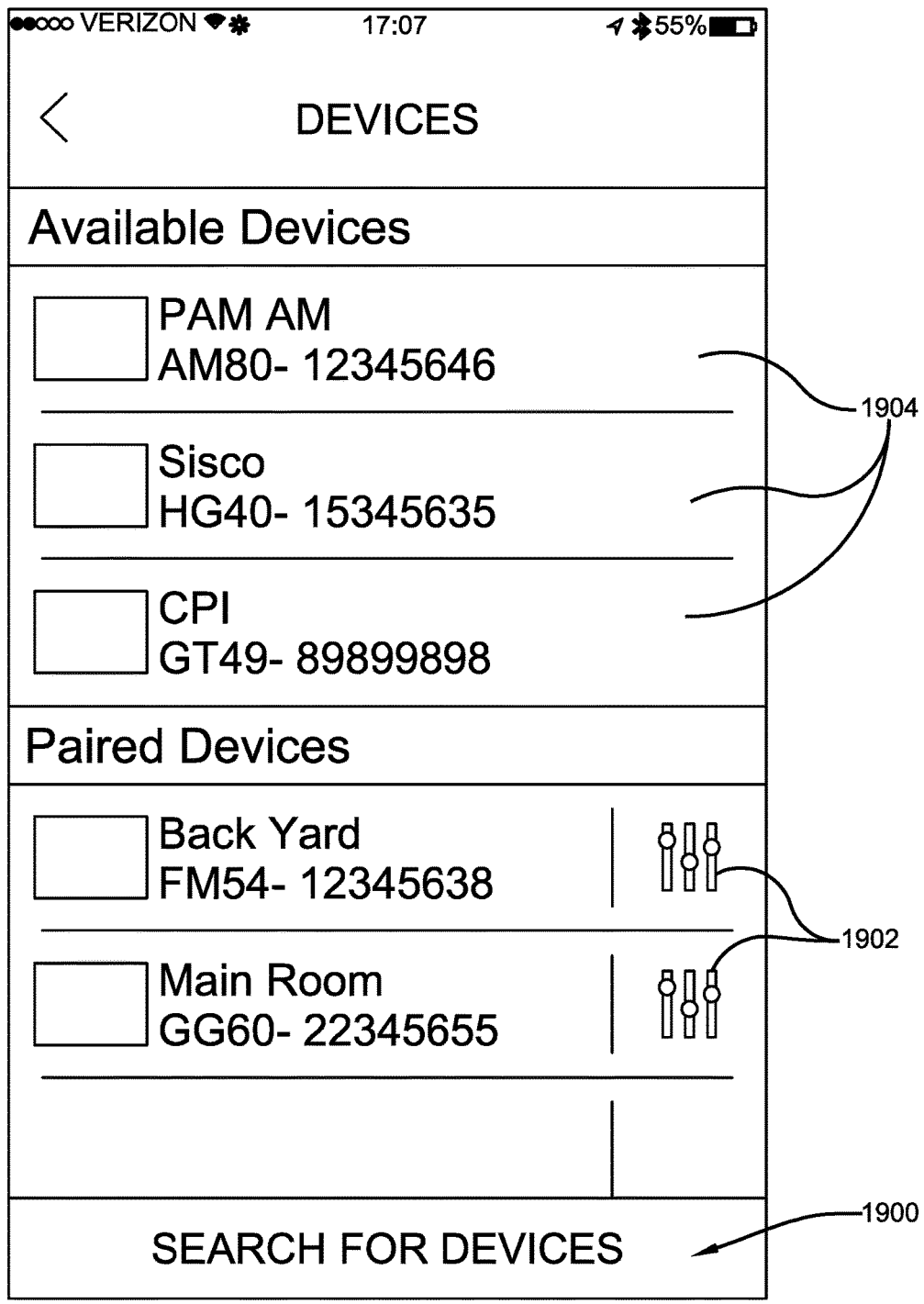
Figure 20:
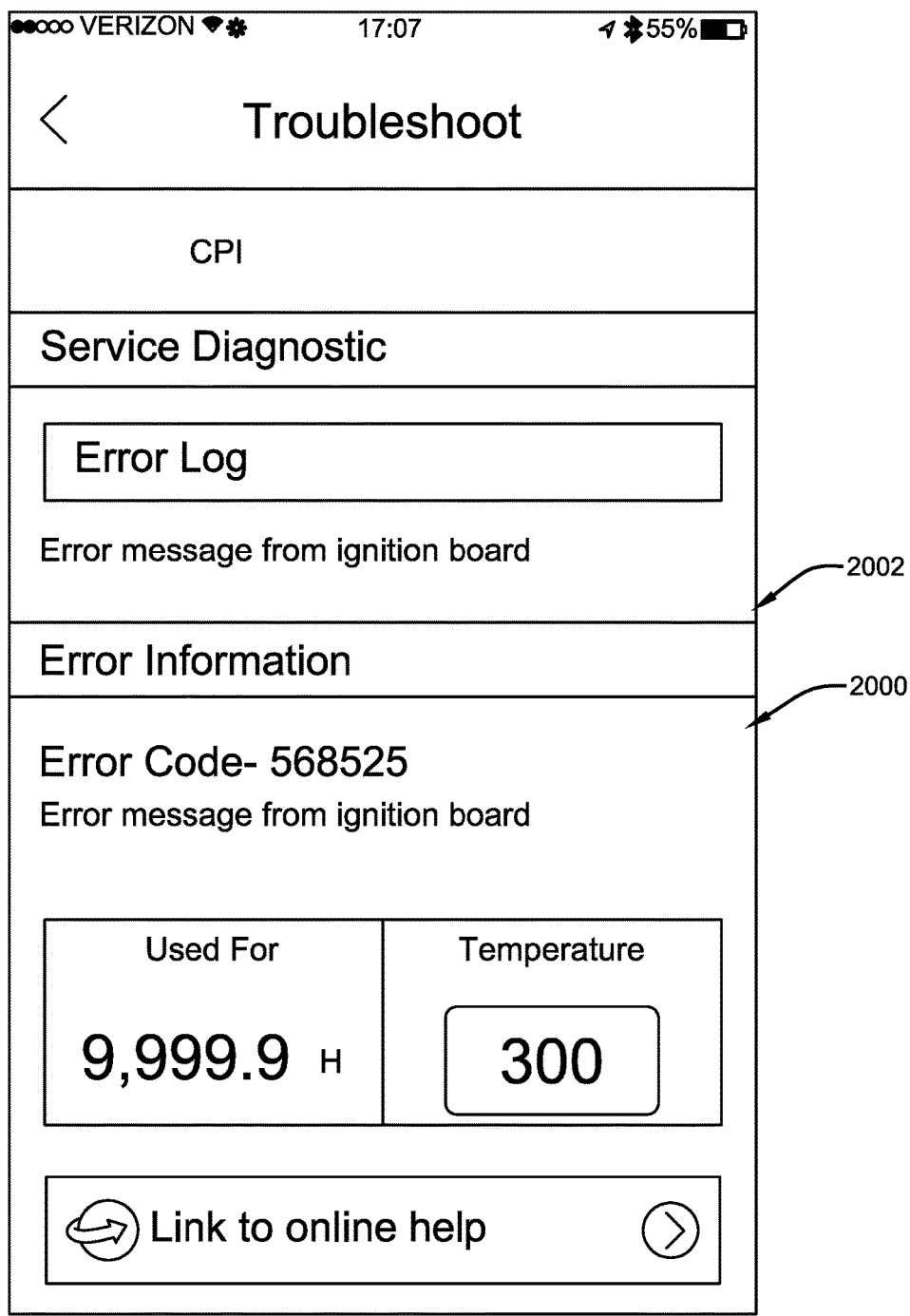

As illustrated in FIGS. 11, 12, and 19, a user may select an available device 1104, 1904, which can result in the application providing for setting up a connection with the available device, as illustrated in FIG. 12. In this example, the name and serial number of the device is displayed, and the user may be asked to enter a security code associated with the device. As an example, a security code may be provided with the device (e.g., printed at a discrete location or provided with documentation), and the user can enter the provided code, and select a connect option to pair the wireless remote control device with the flame-producing device.

Figure 13:
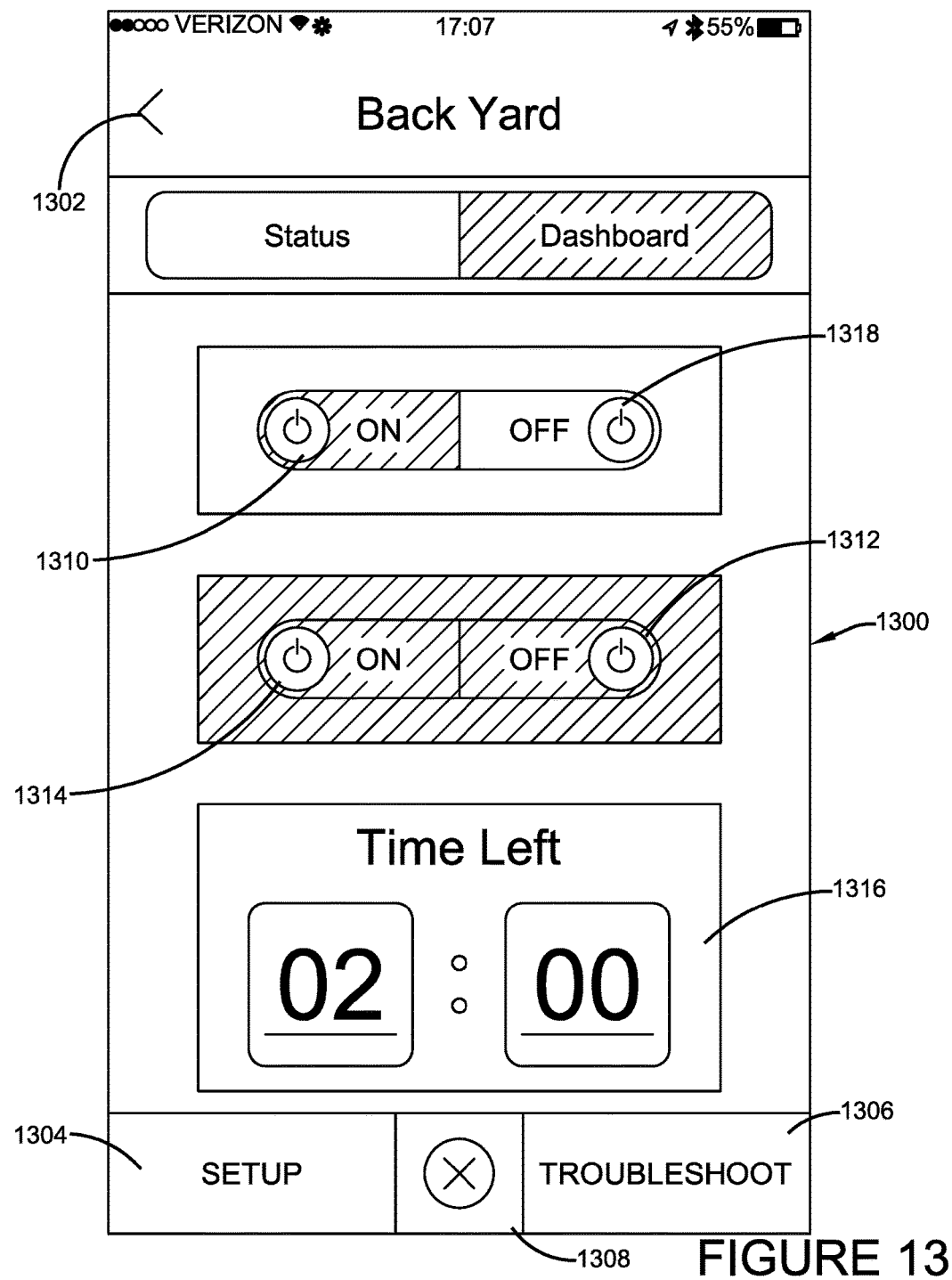
Figure 14:
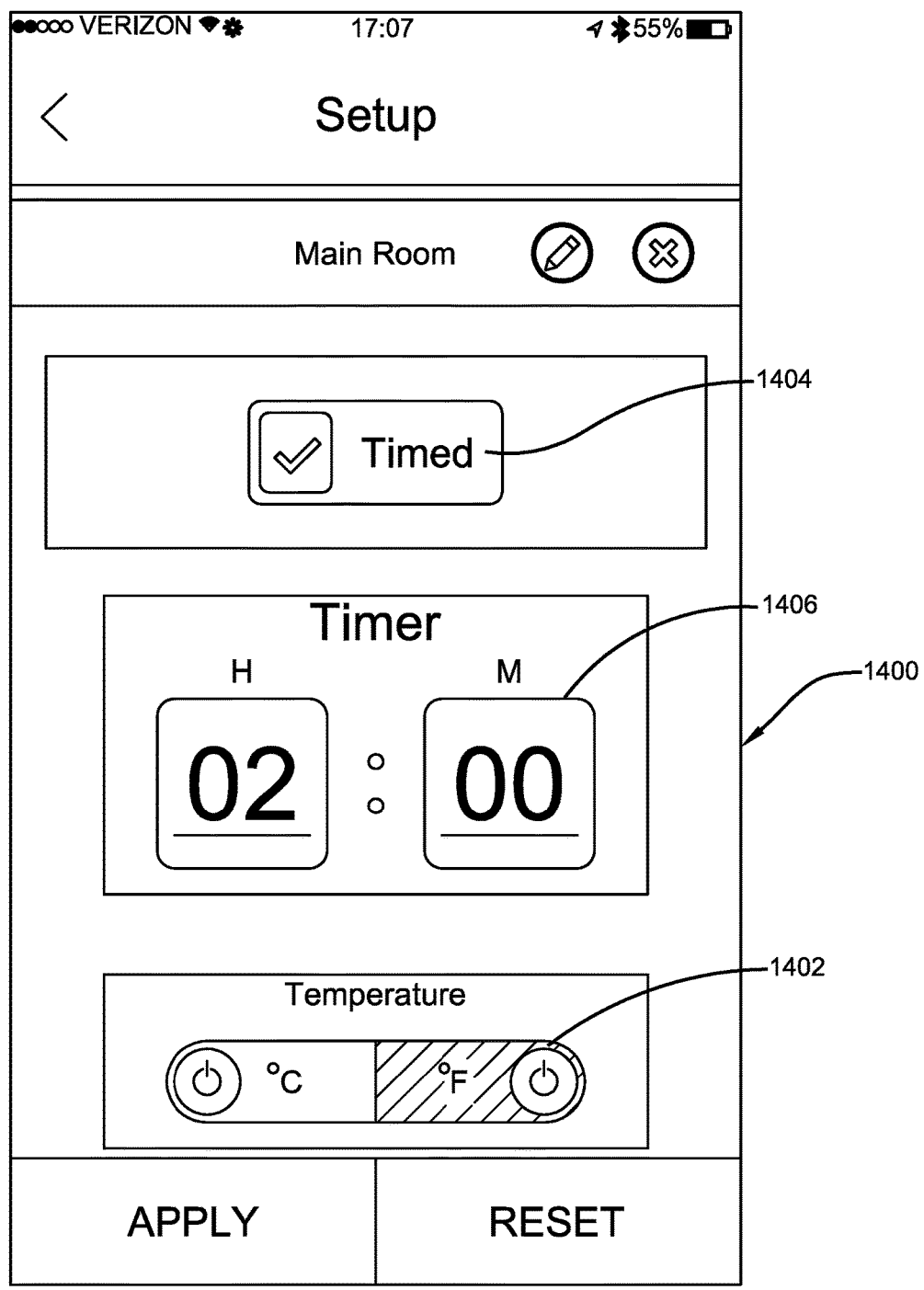

After the user has selected a paired device 1902, the application can provide the user with several options, at 726, on a selected device screen 1300 of FIG. 13. In this implementation, options can include: selecting the return widget 1302 to return to the device screen 1100; selecting the setup widget 1304 to be taken to a configuration screen 1400 to setup the device operations, as illustrated in FIG. 14; selecting a troubleshooting widget 1306 to move to an error log screen (FIG. 20); and selecting the logout widget to log out of the connection with the device. Alternately, the user may choose to activate the device by selecting the activation widget 1310

At 728 of FIG. 7, the user may be able to alter settings for the coupled flame-producing device. The user may be able to select temperature units 1402 for the application; and may be able to select whether to activate a timer 1404, and the length of the timer 1406. At the device screen 1300, the user can select to activate the flame-producing device using the activation widget 1310. In this implementation, after the flame-producing device has been successfully activated (e.g., pilot light activates appropriately), the user may be provided with options to activate the low main valve 1312, and/or or the high main valve 1314. Additionally, the application may provide an amount of time remaining 1316 for the timer that is keeping the device operating.

Figure 15:
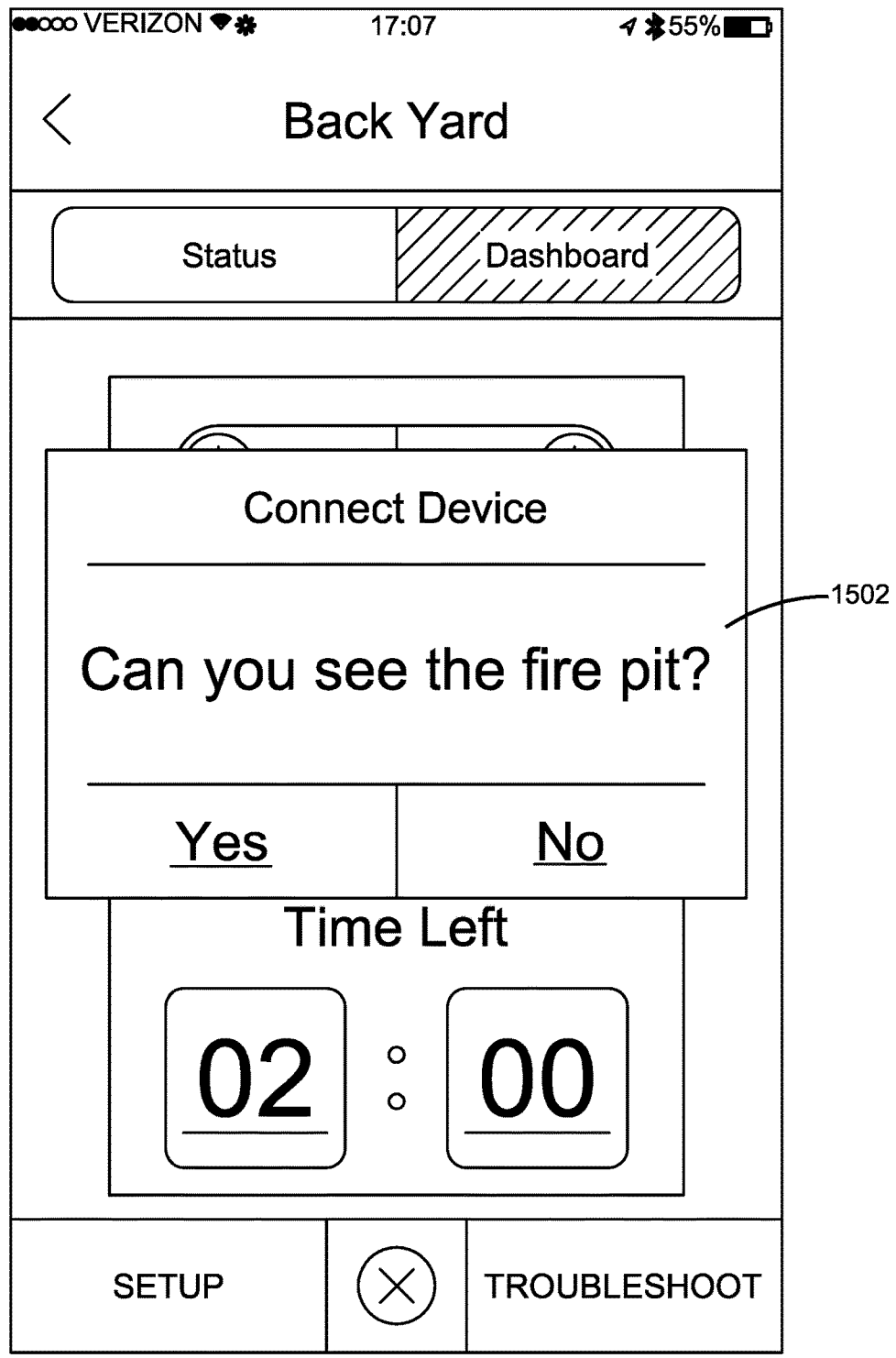
Figure 16:
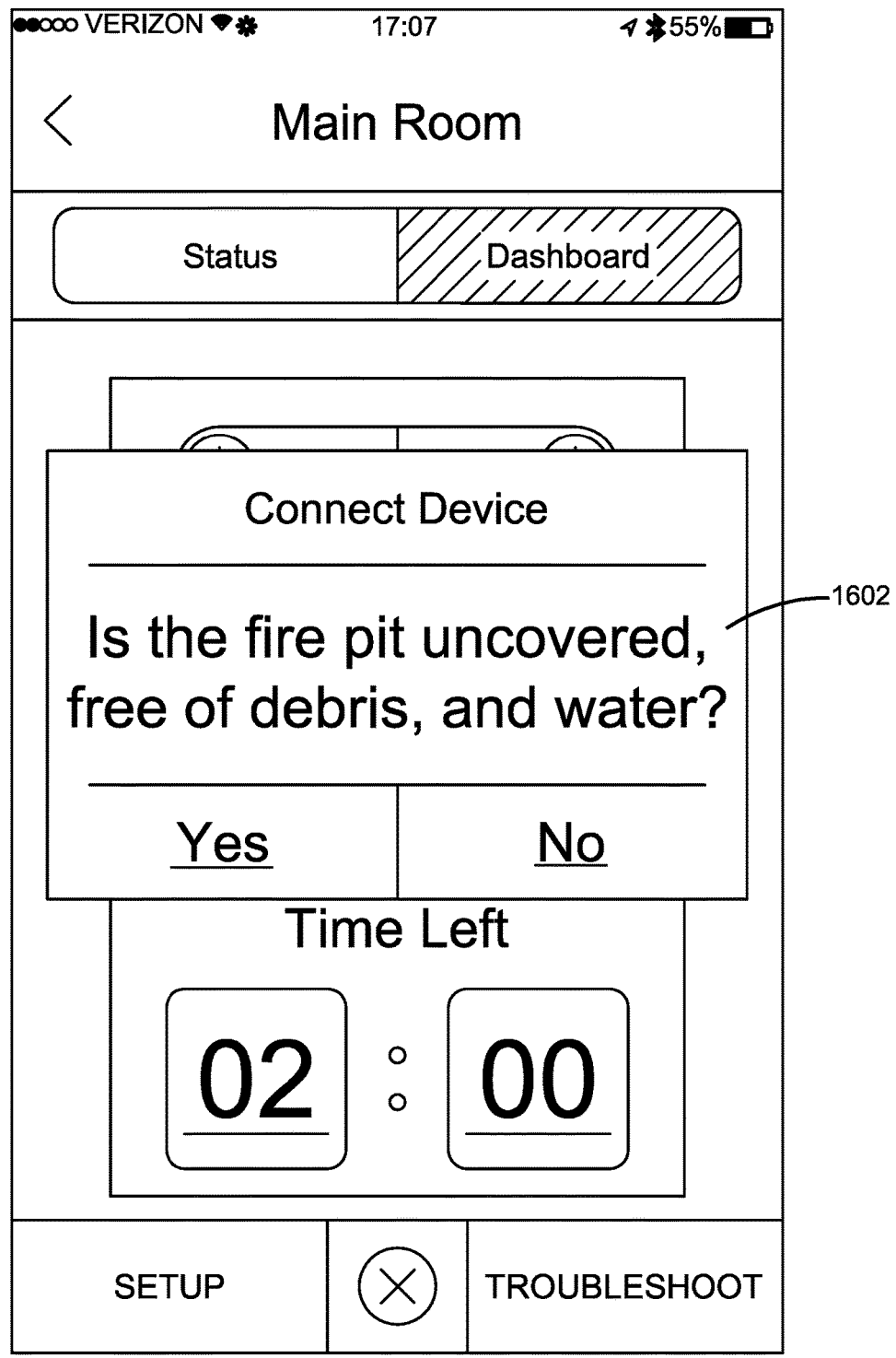
Figure 17:
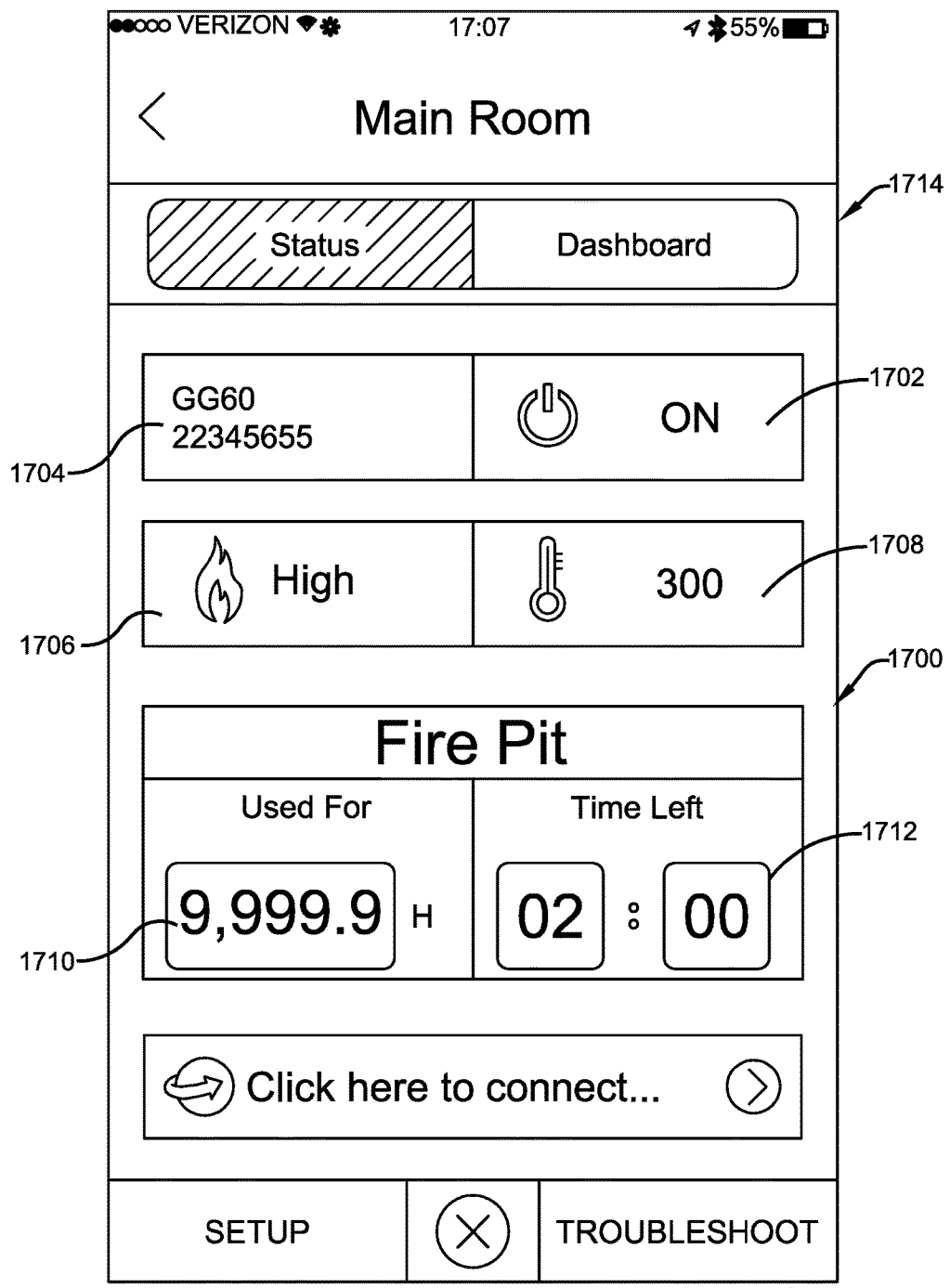
Figure 18:
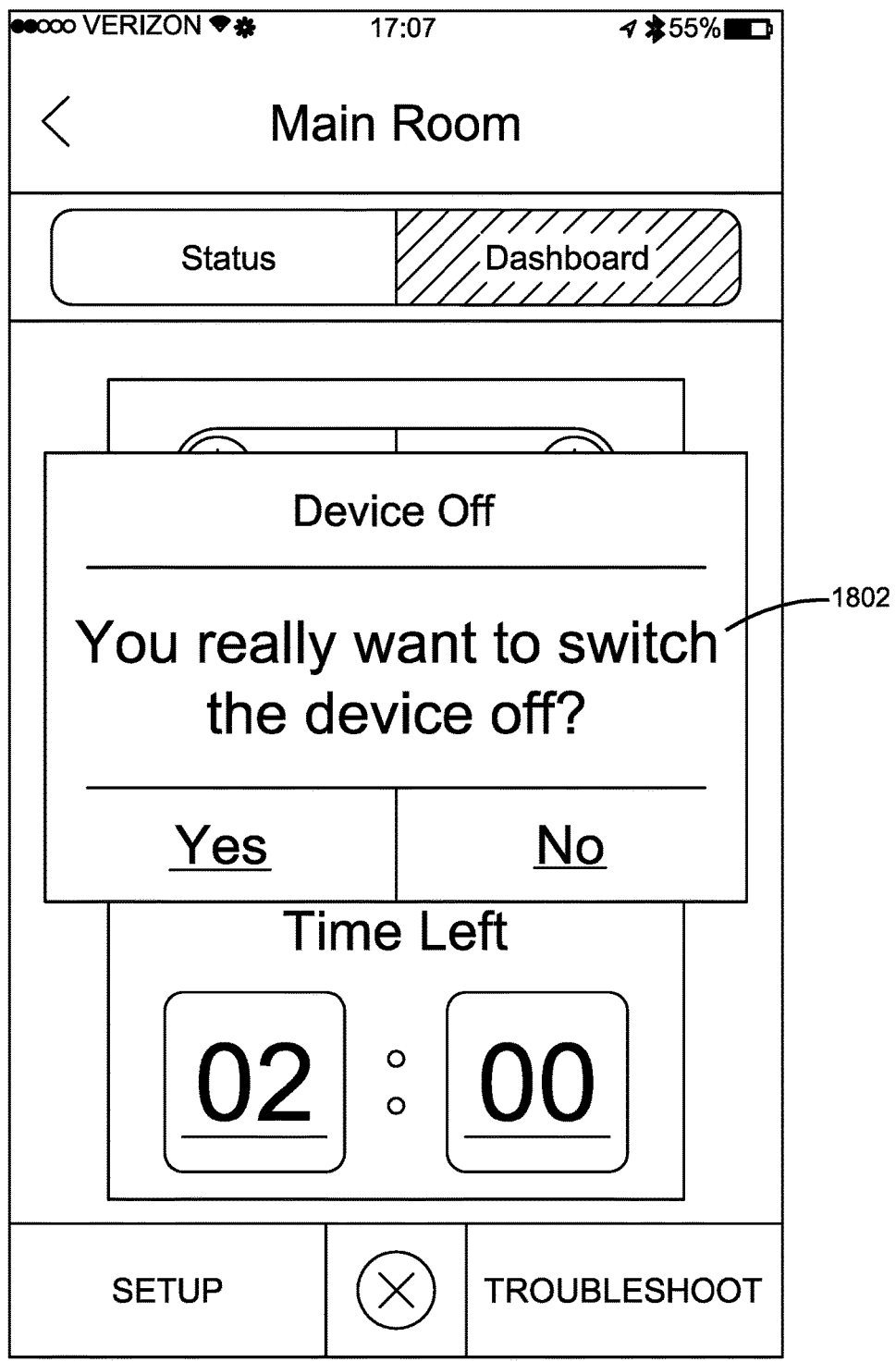

As illustrated in FIGS. 13, 15 and 16, in one implementation, upon selection of the activation widget 1310, the application may provide a notification 1502 to the user to determine whether the user is in visual range of the flame-producing device. Such a notification can be utilized for safety purposes, for example, so that a user may be able to identify potential undesired conditions associated with starting the flame-producing device. Further, in one implementation, upon confirming visual contact with the flame-producing device, the application may provide a second notification 1602, requesting the user perform a visual inspection of the flame-producing device to identify that no undesired conditions exist. In one implementation, upon the user identifying that no undesired conditions exist, the flame-producing device may be activated, and a status screen 1700 of FIG. 17 can be provided.

In this implementation, the status screen may provide the user with several pieces of information, including: activation status 1702 (e.g., on or off); device identification 1704; valve status 1706 (e.g., high, low); temperature 1708; time used 1710; and lime left on timer 1712. In one implementation, the user may select between the status screen 1700, and a device dashboard screen 1300, by selecting one of the appropriate status/dashboard widgets 1714. At the device dashboard screen 1300, the user can optionally, open and/or close the high and low valves by selecting the appropriate on-screen widgets 1312, 1314; and may also view the trouble shooting screen, or error log. At 730 of FIG. 7, the error log screen 2000 can provide the user with information regarding errors that may have occurred during use. As an example, an error message 2002 can be provided by the application. As an example, the error message 2002 may be used by the user or a technician to identify the issues encountered and to provide potential repair advice or service. As another example, the error message 2002 may be uploaded to a remote database to provide for automated alerts and/or repair service.

In one implementation, the user may select to shut off the flame-producing device by selecting the deactivation widget 1318. Upon selection of the deactivation widget, the application may provide a notification 1802 of FIG. 18, to alert the user that they have chosen to shut off the device. Upon confirmation that the user wishes to deactivate the device, the respective fuel valves can be closed to shut down flame operation, and the device may be powered down. At 732, the user may select to exit the application by selecting the log out widget 1308 in FIG. 13, for example, or by alternately shutting down the application on the wireless remote control device through another operation on the remote.

Figure 21:
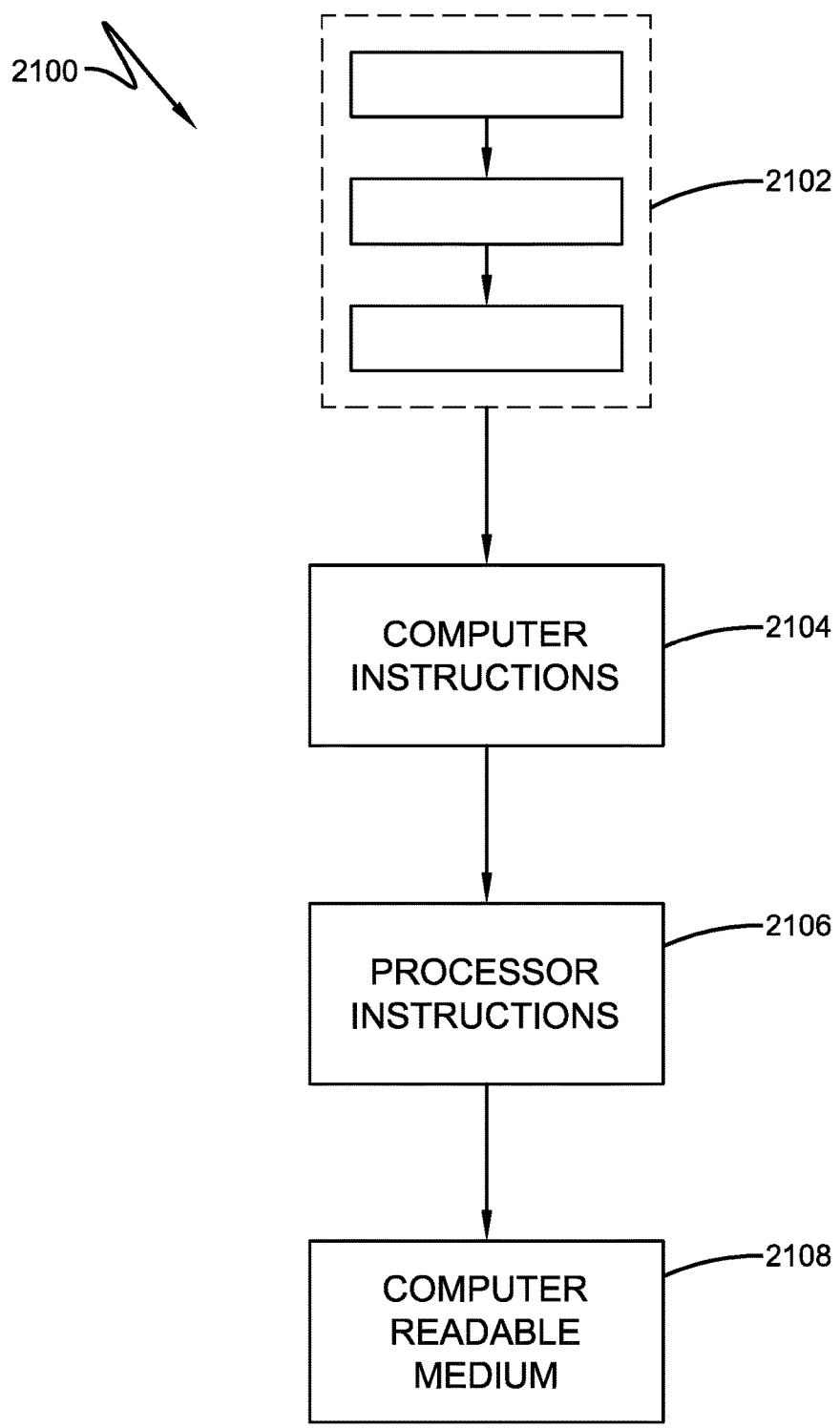
FIG. 21 is an illustration of an exemplary computer-readable medium comprising processor-executable instructions configured to embody one or more of the provisions set forth herein.

In another implementation, a computer-readable medium may comprise processor-executable instructions that can be configured to implement one or more portions of the one or more techniques presented herein. An example computer-readable medium is illustrated in FIG. 21, where the implementation 2100 comprises a computer-readable medium 2108 (e.g., a CD-R, DVD-R, a hard disk drive, flash-drive, solid-state storage, non-volatile memory storage component, and/or other non-transient computer readable medium), on which is encoded computer-readable data 2106. This computer-readable data 2106 in turn comprises a set of computer instructions 2104 that can be configured to operate in accordance with one or more of the techniques set forth herein. In one such implementation 2102, the processor-executable instructions 2104 may be configured to perform a method, such as at least some of the exemplary method illustrated in FIGS. 6 and 7. In another such implementation, the processor-executable instructions 2104 may be configured to implement a system, such as at least some of the exemplary system illustrated in FIGS. 8-20. Many such computer-readable media may be devised by those of ordinary skill in the art that are configured to operate in accordance with the techniques presented herein.

Figure 22:
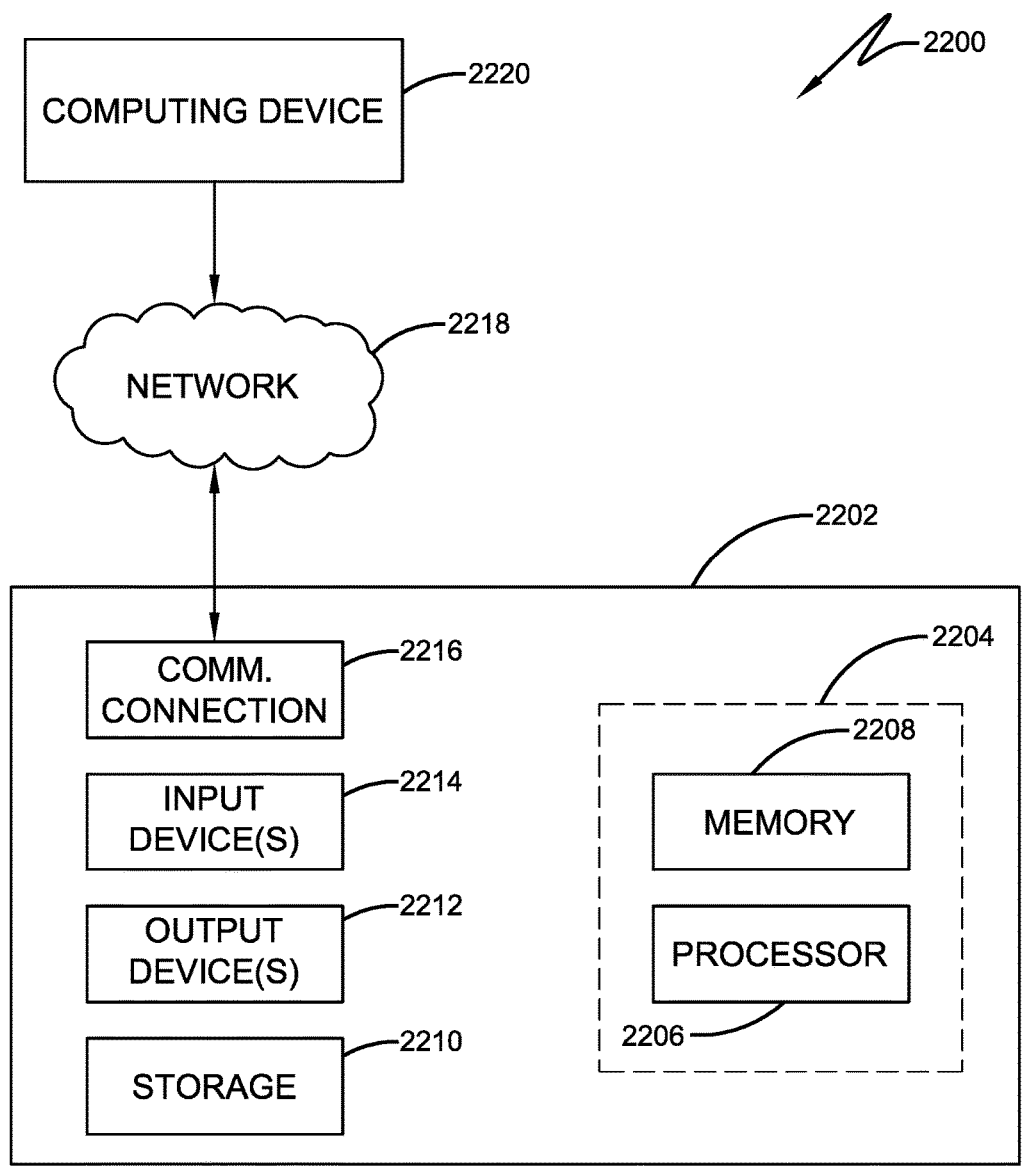
FIG. 22 illustrates an exemplary computing environment wherein one or more of the provisions set forth herein may be implemented.

FIG. 22 and the following discussion provide a brief, general description of a computing environment in/on which one or more or the implementations of one or more of the methods and/or system set forth herein may be implemented. The operating environment of FIG. 22 is merely an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, mobile consoles, tablets, media players, and the like), multiprocessor systems, consumer electronics, mini computers, mainframe computers, distributed computing environments that include any of the above systems or devices, and the like.

Although not required, implementations are described in the general context of "computer readable instructions" executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 22 illustrates an example of a system 2200 comprising a computing device 2202 configured to implement one or more implementations provided herein. In one configuration, computing device 2202 includes at least one processing unit 2206 and memory 2208. Depending on the exact configuration and type of computing device, memory 2208 may be volatile (such as RAM, for example), non-volatile (such as ROM, EEPROM, solid state drive, flash memory, etc., for example) or some combination of the two. This configuration is illustrated in FIG. 22 by dashed line 2204.

In other implementations, device 2202 may include additional features and/or functionality. For example, device 2202 may also include additional storage (e.g., removable and/or non-removable) including, but not limited to, magnetic storage, optical storage, solid state drive, and the like. Such additional storage is illustrated in FIG. 22 by storage 2210. In one implementation, computer readable instructions to implement one or more implementations provided herein may be in storage 2210. Storage 2210 may also store other computer readable instructions to implement an operating system, an application program and the like. Computer readable instructions may be loaded in memory 2208 for execution by processing unit 2206, for example.

The term "computer readable media" as used herein includes computer storage media. Computer storage media includes volatile and nonvolatile, removable and non-removable media implemented in any method or technology for storage of information such as computer readable instructions or other data. Memory 2208 and storage 2210 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 2202. Any such computer storage media may be part of device 2202.

Device 2202 may also include communication connection(s) 2216 that allows device 2202 to communicate with other devices. Communication connection(s) 2216 may include, but is not limited to, a modem, a Network Interface Card (NIC), an integrated network interface, a radio frequency transmitter/receiver, an infrared port, a USB connection or other interfaces for connecting computing device 2202 to other computing devices. Communication connection(s) 2216 may include a wired connection or a wireless connection. Communication connection(s) 2216 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 2202 may include input device(s) 2204 such as keyboard, mouse, pen, voice input device, touch input device, infrared cameras, video input devices, and/or any other input device. Output device(s) 2212 such as one or more displays, speakers, printers, and/or any other output device may also be included in device 2202. Input device(s) 2214 and output device(s) 2212 may be connected to device 2202 via a wired connection, wireless connection, or any combination thereof. In one implementation, an input device or an output device from another computing device may be used as input device(s) 2214 or output device(s) 2212 for computing device 2202.

Components of computing device 2202 may be connected by various interconnects, such as a bus. Such interconnects may include a Peripheral Component Interconnect (PCI), such as PCI Express, a Universal Serial Bus (USB), firewire (IEEE 1394), HDMI, an optical bus structure, a wireless bus structure, and the like. In another implementation, components of computing device 2202 may be interconnected by a network. For example, memory 2208 may be comprised of multiple physical memory units located in different physical locations interconnected by a network.

Those skilled in the art will realize that storage devices utilized to store computer readable instructions may be distributed across a network. For example, a computing device 2220 accessible via network 2218 may store computer readable instructions to implement one or more implementations provided herein. Computing device 2202 may access computing device 2220 and download a part or all of the computer readable instructions for execution. Alternatively, computing device 2202 may download pieces of the computer readable instructions, as needed, or some instructions may be executed at computing device 2202 and some at computing device 2220.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation"

in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A system for managing one or more flame-producing devices, comprising:
   a first communication component engaged with a first flame-producing device to wirelessly receive data indicative of instructions for managing the first flame-producing device, and wirelessly transmit data indicative of status information for the first flame-producing device, the communication component comprising a first short-range, wireless networking component to exchange data wirelessly with a wirelessly coupled remote control device, the remote control device used to wirelessly couple with the first short-range, wireless networking component to wirelessly communicate with the first communication component to transmit the data indicative of instructions for managing the first flame-producing device;
   a first controller component operably engaged with the first flame-producing device and operably coupled with the first communication component to control one or more operations of the first flame-producing device, and provide the data indicative of status information for the first flame-producing device, the first controller component comprising one or more of:
      a first relay to control operation of one or more connected components of the flame-producing device; and
      a microcontroller to control operation of the first relay.

2. The system of claim 1, comprising one or more of:
   a second relay configured to control operation of an operably coupled pilot valve;
   a third relay configured to control operation of an operably coupled main low valve;
   a fourth relay configured to control operation of an operably coupled main high valve;
   a fifth relay configured to control operation of an operably coupled ignitor;
   a temperature sensor; and
   a thermocouple sensor.

3. The system of claim 1, the first short-range, wireless networking component used to exchange data wirelessly with one or more coupled wirelessly coupled devices.

4. The system of claim 1, the wireless remote control device to receive the data indicative of status information for the first flame-producing device and provide an indication of the status of the first flame-producing device to a user of the wireless remote control device.

5. The system of claim 1, the wireless remote control device comprising a mobile computing device comprising an application comprising a user interface that provides a user with operational controls and indicators for managing the first flame-producing device, the application, in conjunction with the mobile computing device, to provide the data indicative of instructions for managing the first flame-producing device, and process the data indicative of status information for the first flame-producing device.

6. The system of claim 1, comprising a controller area network (CAN) communication bus, at least a portion of which operably, communicatively couples the communication component with the controller component.

7. The system of claim 1, the short-range, wireless networking component comprising a low-energy Bluetooth module for transmitting and receiving a wireless signal.

8. The system of claim 1, comprising:
   a second communication component operably engaged with a second flame-producing device to wirelessly receive data indicative of instructions for managing the second flame- producing device, and wirelessly transmit data indicative of status information for the second flame-producing device, the second communication component comprising a second short-range, wireless networking component to exchange data wirelessly with one or more wirelessly coupled devices; and
   a second controller component engaged with a second flame-producing device and operably coupled with the second communication component to control one or more operations of the second flame-producing device, and provide the data indicative of status information for the second flame-producing device;
   the wireless remote control device to wirelessly couple with the second short-range, wireless networking component to wirelessly communicate with the second communication component to, at least, transmit the data indicative of instructions for managing the second flame-producing device.

9. The system of claim 8, the second short-range, wireless networking component configured to exchange data wirelessly with the first short-range, wireless networking component.

10. A system for controlling one or more flame-producing devices, comprising:
    a wireless remote control device that wirelessly couples with one or more short-range, wireless networking components and transmits data indicative of instructions for managing a flame-producing device, where respective one or more short-range, wireless networking components are disposed in a communication component operatively engaged with their respective flame-producing devices; and non-transient computer readable media disposed on the wireless remote control device, which, when executed by a processor disposed on the wireless remote control device, performs one or more of the following:

wirelessly coupling the remote control device with one of the one or more short- range, wireless networking components in a networking configuration; and transmit, to the one of the one or more short-range, wireless networking components, data indicative of instructions to activate or deactivate the flame-producing device comprising the associated communications component;

the non-transient computer readable media disposed on the wireless remote control device, when executed resulting in the wireless remote control device performing one or more of the following:

transmit, to the one of the one or more short-range, wireless networking components, data indicative of instructions to open and/or close a low flame valve in the flame-producing device comprising the associated communications component;

transmit, to the one of the one or more short-range, wireless networking components, data indicative of instructions to open and/or close a high flame valve in the flame-producing device comprising the associated communications component;

transmit, to the one of the one or more short-range, wireless networking components, data indicative of instructions to initiate an igniter disposed in the flame-producing device comprising the associated communications component;

wirelessly decouple the wireless remote control device with the one of the one or more short-range, wireless networking components; and wirelessly couple the remote control device with another of the one or more short-range, wireless networking components in a networking configuration.

11. The system of claim 10, the non-transient computer readable media disposed on the wireless remote control device, when executed resulting in the wireless remote control device transmitting to the one of the one or more short-range, wireless networking components, data indicative of instructions to wirelessly couple the flame-producing device comprising the associated communications component with another communications component in another flame-producing device.

12. The system of claim 10, the wireless remote control device receiving data indicative of status information for one or more of the flame-producing devices, resulting in the non-transient computer readable media being executed on the wireless remote control device to provide an indication of the status of the first flame-producing device to a user of the wireless remote control device.

13. A method for controlling one or more flame-producing devices using a wireless remote control device:

wirelessly coupling a remote control device with a communications component operably disposed on a first flame-producing device, the communication component comprising a first short-range, wireless networking component to exchange data wirelessly with the remote control device;

wirelessly transmitting data indicative of component control instructions from the remote control device to the communications component of the first flame-producing device, resulting in a first controller component engaged with a first flame-producing device controlling one or more operations of the first flame-producing device; and wirelessly receiving data indicative of status information for the first flame-producing device, from the first short-range, wireless networking component, resulting in an indication of the status of the first flame-producing device being provided to a user of the wireless remote control device; and comprising using a controller area network (CAN) communication bus, to operably, communicatively couple the communication component with the controller component.

14. The method of claim 13, comprising wirelessly transmitting data from the remote control device to the first short-range, wireless networking component, the data comprising one or more of:

data indicative of instructions to activate and/or deactivate the first flame-producing device;

data indicative of instructions to open and/or close a low flame valve disposed in the first flame-producing device;

data indicative of instructions to open and/or close a high flame valve disposed in the first flame-producing device; and data indicative of instructions to initiate an igniter disposed in the first flame-producing device.

15. The method of claim 13, comprising using the wireless remote control device to transmit, to the first flame-producing device, data indicative of instructions to wirelessly couple the first flame-producing device to a second flame-producing device within range of a short-range, wireless networking component in the first flame-producing component.

16. The method of claim 13, comprising using the wireless remote control device to transmit, to the first flame-producing device, data indicative of instructions to wirelessly transmit back to the wireless remote control device data indicative of a status of the first flame-producing device.

17. The method of claim 13, wirelessly transmitting data from the remote control device comprising using a mobile computing device, comprising an application, comprising a user interface, to provide a user with operational controls and indicators for managing the first flame- producing device, the application, in conjunction with the mobile computing device, to provide the data indicative of instructions for managing the first flame-producing device, and process the data indicative of status information for the first flame-producing device.

* * * * *